(12) United States Patent
Steinbrecher

(10) Patent No.: US 8,125,198 B2
(45) Date of Patent: Feb. 28, 2012

(54) MULTI-FUNCTION MODULATOR FOR LOW-POWERED, WIRED AND WIRELESS COMMAND, CONTROL, AND COMMUNICATIONS APPLICATIONS

(75) Inventor: Donald H. Steinbrecher, Brookline, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 567 days.

(21) Appl. No.: 12/313,789

(22) Filed: Nov. 24, 2008

(65) Prior Publication Data

US 2010/0127743 A1    May 27, 2010

(51) Int. Cl.
*G05F 1/00* (2006.01)
*H02M 3/156* (2006.01)

(52) U.S. Cl. .......................... 323/222; 323/351
(58) Field of Classification Search .................. 363/17, 363/132; 323/222, 351; 331/110
See application file for complete search history.

(56) References Cited

U.S. PATENT DOCUMENTS 4,490,689 A    12/1984    Jong
(Continued)

*Primary Examiner* — Matthew Nguyen
*Assistant Examiner* — Emily Pham
(74) *Attorney, Agent, or Firm* — James M. Kasischke; Michael P. Stanley; Jean-Paul A. Nasser

(57) ABSTRACT

An amplitude, phase and frequency modulator circuit is provided with the circuit containing a periodically driven switch. The circuit connects a DC power source and a resistive load. Periodic operation of the switch generates a square-wave of voltage across the load. A transistor used as a switch is embedded in a switch driver that controls base current and base-emitter reverse bias voltage. The modulator DC input resistance is approximately equal to the load resistance when the switch ON-state period and OFF-state period are approximately equal. The modulator efficiency is nearly one hundred percent. The frequency response of the square-wave modulator system is high-pass with a lower cutoff frequency determined by element values.

6 Claims, 19 Drawing Sheets

U.S. PATENT DOCUMENTS

| | | |
|---|---|---|
| 4,742,316 A | 5/1988 | Riedger |
| 4,831,280 A | 5/1989 | Caya et al. |
| 5,027,051 A * | 6/1991 | Lafferty .................. 323/222 |
| 5,594,378 A | 1/1997 | Kruse et al. |
| 6,346,780 B1 | 2/2002 | Parra |
| 6,774,692 B2 * | 8/2004 | Kim et al. .................. 327/172 |
| 7,245,113 B2 * | 7/2007 | Chen et al. .................. 323/271 |
| 7,679,410 B1 * | 3/2010 | Steinbrecher .............. 327/108 |
| 2009/0185398 A1 * | 7/2009 | Cuk .......................... 363/21.1 |

* cited by examiner

MULTI-FUNCTION MODULATOR FOR LOW-POWERED, WIRED AND WIRELESS COMMAND, CONTROL, AND COMMUNICATIONS APPLICATIONS

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

The application submitted herein is related to: U.S. patent application Ser. No. 12/287,158, filed on Sep. 29, 2008, entitled "A System and Method for Improving the Efficiency and Reliability of a Broadband Transistor Switch for Periodic Switching Applications"; U.S. patent application Ser. No. 12/022,506, filed on Jan. 30, 2008 entitled "A Method for Coupling a Direct Current Power Source Across a Dielectric Membrane or Other Non-Conducting Membrane" and U.S. patent application Ser. No. 12/022,537 filed on Jan. 30, 2008 entitled "A Method for Coupling a Direct Current Power Source Across a Nearly Frictionless High-Speed Rotation Boundary". All applications are by the inventor, Dr. Donald H. Steinbrecher.

BACKGROUND OF THE INVENTION (1) Field of the Invention

The present invention relates to a power modulator that converts a DC or low frequency time-varying voltage to a high-frequency square-wave carrier signal.

(2) Description of the Prior Art

Sensor systems located along fixed or towed tethers need to transmit sensor data to certain types of airborne platforms and to certain types of floating sensor systems. Direct Current (DC) power for operation is at a premium because of the long lengths and/or the small size of the sensor tethers. Furthermore, networked sensor systems may involve thousands of individual sensors, each of which requires power for command, control, and communications. Thus, efficient and reliable delivery of power is critical to the long-term operation of tethered sensor systems.

SUMMARY OF THE INVENTION

Accordingly, it is a general purpose and primary object of the present invention to provide a power modulator that provides efficient and reliable power to a relatively distant load.

It is a further object of the present invention to provide a power modulator that supplies efficient and reliable power for wireless and wired command, control and communication transmitters.

It is a still further object of the present invention to provide a power modulator that converts a positive or negative variable-amplitude voltage source to a high-frequency traveling square-wave of energy on a transmission line.

In this application, the term "modulator' refers to an electronic circuit that is designed to impose a low frequency information bearing signal onto a high frequency carrier signal. For example, a voice signal derived from a microphone could be used to change the frequency of a 100 Mhz carrier signal in proportion to the amplitude of the voice signal in order to create a frequency modulated carrier for broadcast in the commercial FM band between 88 Mhz and 108 Mhz. The present invention relates to a power modulator that converts a DC or low frequency time-varying voltage to a high-frequency square-wave carrier signal.

If the amplitude of the voltage source is a constant DC value, then the amplitude of the resulting square-wave is also constant. If the amplitude of the voltage source is also a variable function of time, then the amplitude of the resulting square-wave is also the same variable function of time and the resulting square-wave carrier is said to be "amplitude modulated".

In a second embodiment, the amplitude of the voltage source can be a constant DC voltage while the frequency of the square-wave is modulated with a time varying signal so that the resulting carrier is frequency modulated in proportion to the time varying signal. In this embodiment, the square-wave power is determined by the voltage amplitude of the DC source and the carrier is said to be "frequency modulated". The modulation can contain information in either analog or digital form.

In a third embodiment, the amplitude of the voltage source can be a constant DC voltage while the phase of the square-wave is modulated with a time varying signal so that the resulting carrier is phase-modulated in proportion to the time varying signal. In this embodiment, the square-wave power is determined by the voltage amplitude of the direct current source and the carrier is said to be "phase modulated".

In a fourth embodiment, the amplitude of the voltage source and the phase of the square-wave can be modulated simultaneously in order to create complex signal forms such as quadrature amplitude modulation (QAM). Those skilled in the art will recognize the potential value of these embodiments.

One inventive step taken concerns the power efficiency of the modulator circuit, which can approach one hundred percent. A second inventive step concerns the modulator-circuit bandwidth of operation, which, in the fundamental limit, has a low frequency cutoff but no high frequency cutoff. A third inventive step relates to the ability to convert a square-wave to a DC voltage with an electronic demodulator circuit that has two relevant properties: 1) the power efficiency of the conversion can approach a fundamental limit of one hundred percent and 2) the input impedance of the circuit is indistinguishable from a constant resistance when driven by a square-wave. A fourth inventive step is recognized by connecting the square-wave modulator of the first inventive step to the square-wave demodulator circuit of the third inventive step by means of a transmission line with a characteristic impedance that is identical to the input impedance of the circuit of the third inventive step in order to realize a power transmission system with power efficiency that can approach a fundamental limit of one hundred percent.

Parasitic elements, such as the distributed capacitance of a physical inductor, the distributed inductance of a physical capacitor and the distributed physical circuit losses will have the result that any physical enablement of the disclosed modulator will not achieve the limits of one hundred percent efficiency and high-pass bandwidth. However, these limits can be approached by the careful selection of the physical components and other design parameters—when these embodiments are enabled by those skilled in the art.

The well-known concept of a "two-port network" is used as a teaching aid in the explanations and the claims that follow. A two-port network may be used to represent any electronic circuit with two defined terminal pairs or "ports". Representations described in electronics literature define the relationship among the voltages and currents that are present at the two ports. These relationships depend on the markup of the circuits within the network but can often be generalized. For example, if the network contains only linear, passive, and bi-lateral components, then the port relationships can be specified independent of the complexity of the internal network. Those ordinarily skilled in the electronic arts will be familiar with the concept of a two-port network and uses of the network in the describing the behavior of complex electronic networks.

To attain the embodiments and inventive steps, the system of the present invention uses a periodically driven switch to perform a modulator function that generates a high frequency square-wave of energy from a slowly varying voltage source, such as a battery, energy-storage capacitor, active solar cell or an audio power amplifier.

In one implementation, a transistor may be used as a periodic switch by driving the base-emitter circuit such that the collector-emitter circuit is periodically switched between saturation and cutoff. Transistors typically have high current gain so that a current flowing in the base-emitter circuit may allow up to one hundred or more units of saturation current to flow in the collector-emitter circuit.

The switch driver comprises a circuit that is capable of delivering a controlled forward base current to switch the transistor into saturation, which may be described as a switch "ON" condition and a controlled reverse base-emitter bias voltage to switch the transistor collector-emitter junction into cutoff, which may be described as a switch "OFF" condition, without exceeding the reverse breakdown of the base-emitter junction.

The modulator system, disclosed herein, comprises a circuit realized with conventional electronic components. If all of the system components were ideal, then the modulator system would have a lower cutoff frequency but not an upper cutoff frequency. The upper frequency limit for the disclosed modulator system will be a result of the parasitic elements associated with non-ideal components. Therefore, the instantaneous operating bandwidth of the modulator system can be large.

The disclosed modulator can be used to convert DC power at a convenient voltage to a square-wave that can be transformed in such a way as to minimize the loss associated with power transmission over a long transmission line. A broadband transformer can be used to change the ratio of voltage to current at the same power level. Thus, the transmission line power that is lost as a function of the square of the current times the Ohmic resistance of the conductors can be reduced stepping up the voltage and stepping down the current. If a lossy transmission line is preceded by a transformer with a turns ratio 1:n and followed by a transformer with turns ratio n:1 then the current on the transmission line is reduced by a factor of n and Ohmic·losses are reduced by a factor of $n^2$.

The transmitted square-wave can be efficiently converted to provide a convenient DC voltage at the far end of a transmission line. A feature of this invention provides a means to convert a traveling square-wave of energy to DC while providing a matched impedance to the characteristic impedance of the transmission line on which the square-wave is traveling. The presence of one or more transformers in the energy path does not affect the operation of the system provided only that the rules of impedance matching are followed and that the location of the transformers preserve the square-wave signal characteristics. Achieving the matched condition is necessary to prevent reflections and standing waves on the transmission line and, in addition, allows a fundamental performance limit of nearly 100 percent efficiency to be predicted when the energy transfer system is analyzed with ideal components.

The disclosed modulator design may find application in phased-array antenna systems in which a modulator is used to drive each element of the phased array. Furthermore, by using the disclosed method, amplitude and phase are independently and electronically controllable without affecting either the efficiency of operation or the bandwidth properties of the modulator. Modern modulation types, such as Quadrature Amplitude Modulation, also require simultaneous control of both amplitude and phase. Also, because of the efficiency of the disclosed [square-wave]-to-DC converter, the disclosed transmission line matched condition, the modulator, transmission line and [square-wave]-to-DC converter may find application in the efficient transmission of power. Further, the transmission line may be replaced by a pair of coupled wideband antennas capable of supporting the square-wave energy spectrum and the system thus embodied may be used for the efficient wireless transmission of power.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

A description of a switch-driver design is disclosed in five sections. In a first section, concepts are used to explain circuit operation in succeeding sections. In a second section, the operation of an energy efficient square-wave generator is explained. In a third section, an energy efficient [square-wave]-to-DC converter is disclosed, which provides a foundation for the switch-driver design disclosed in a fourth section. The circuit of the square-wave generator that provides a foundation for the amplitude-phase modulator design is disclosed in a fifth section.

Introduction to the Disclosed Method

Figure 1:
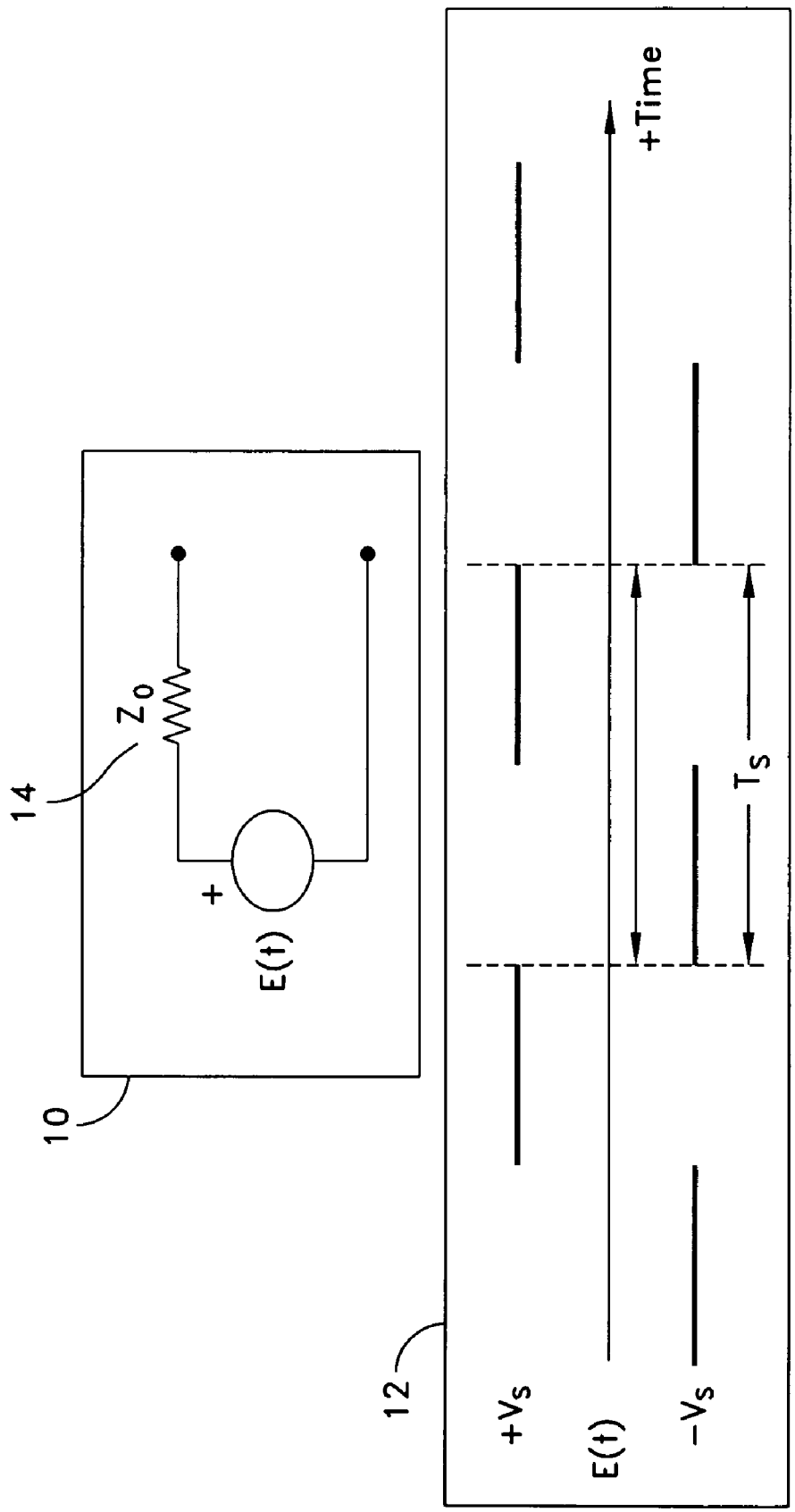
FIG. 1 depicts a Thevenin-Equivalent square-wave source.

In FIG. 1, a Thevenin-Equivalent square-wave source 10 is depicted. A circuit in the figure may be used to represent the output of a transmission line of any length and having a characteristic impedance equal to $Z_0$. The source is a square-wave generator having an amplitude, $V_S$ and a period, $T_S$.

In the circuit, a voltage 12 of the square-wave source 10 switches between a positive value state, $+V_S$ and a negative value state, $-V_S$, which have the same magnitude but an opposite polarity. The switching operation is periodic with a period $T_S$ and with equal dwell times in each state. Thus, the average value of the square-wave generator voltage is zero. Furthermore, the time required to switch between the two states is negligible and is assumed to be zero.

A characteristic impedance 14 of the Thevenin-Equivalent circuit is $Z_0$, a positive real number. In general, a Thevenin-Equivalent source impedance may have a negative real part. However, for the purposes of this disclosure, only positive real values of $Z_0$ are considered. This restriction is consistent with practical applications of the disclosed method.

If the equivalent circuit of FIG. 1 were used to drive a lossless transmission line with characteristic impedance equal to $Z_0$, then the Thevenin-equivalent circuit for the output of the transmission line would be identical to the illustration in FIG. 1 regardless of the length of the transmission line.

Figure 2:
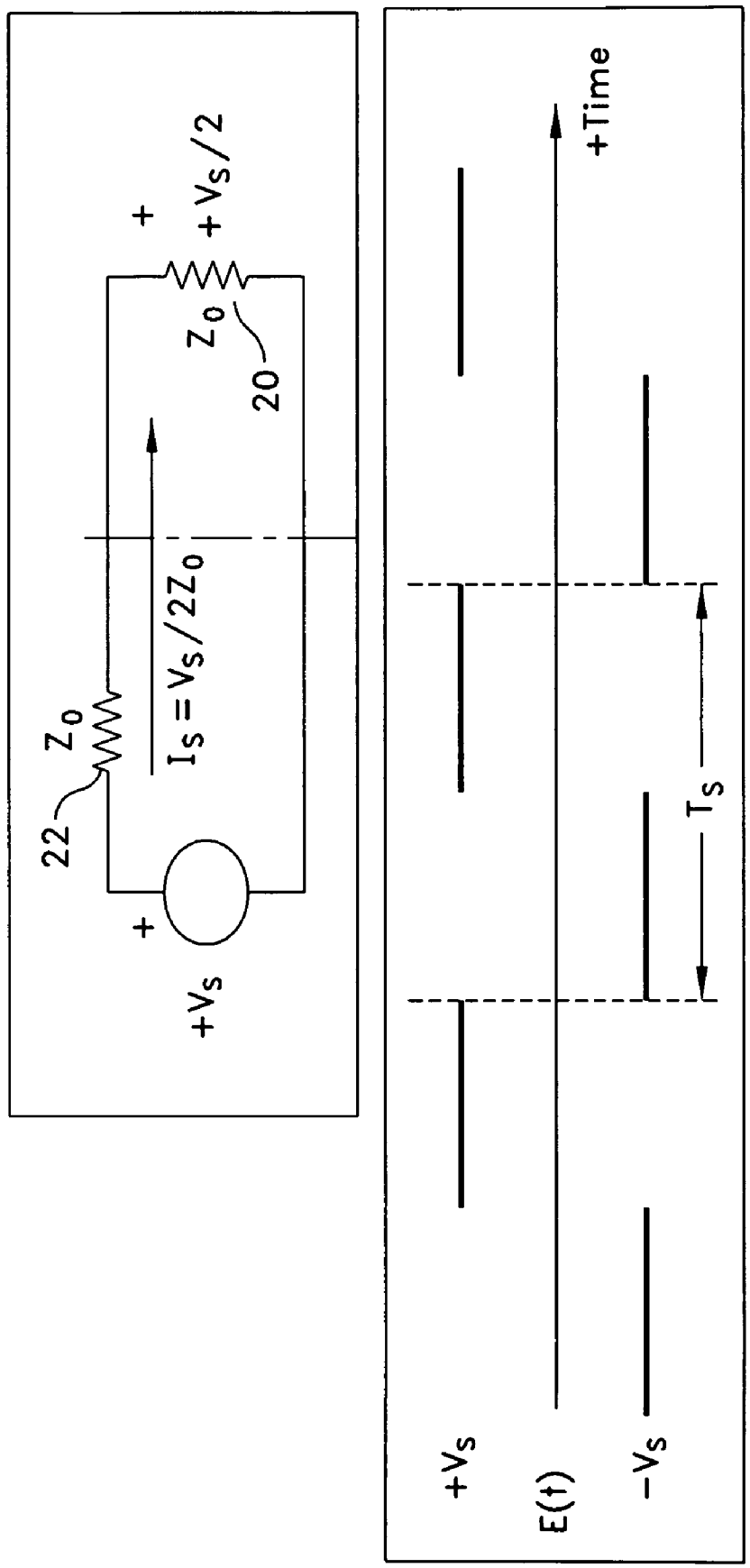
FIG. 2 depicts an optimally-loaded square-wave source.

The maximum power available from the Thevenin-equivalent circuit of FIG. 1 is equal to the power that would be delivered to a load resistor equal to $Z_0$, as illustrated in FIG. 2. In FIG. 2, maximum power transfer occurs when the generator is driving a load resistance that is equal to the source resistance of the generator. This condition for maximum power transfer is well known to those skilled in the electronic arts. The load resistor 20 is $Z_0$, which is equal to the generator resistance 22. Under these conditions, the voltage across the load resistor 20 is one half of the voltage of the generator and the current is one half of the short-circuit current available from the Thevenin-Equivalent generator.

Figure 3:
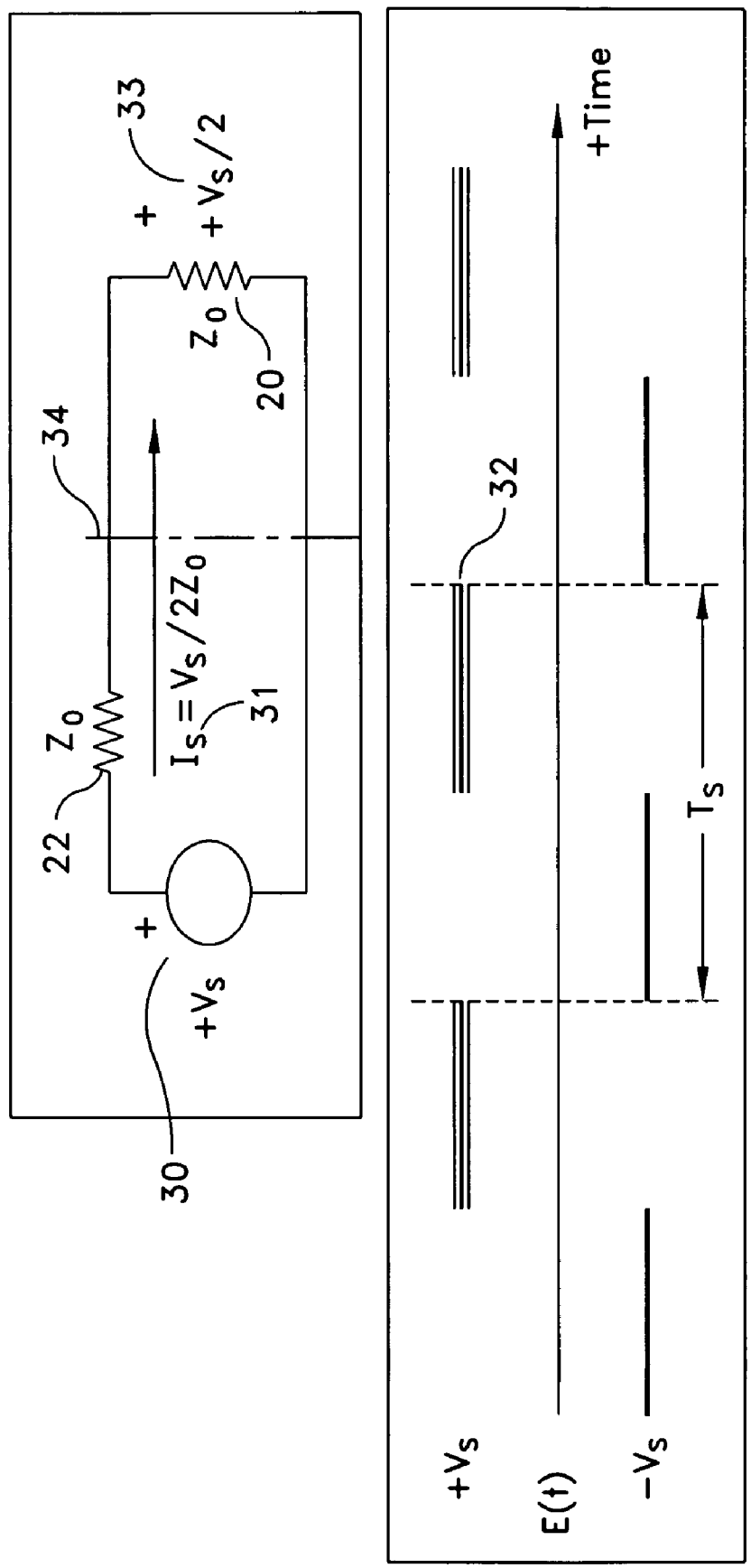
FIG. 3 depicts a square-wave source, positive half period.

During a positive half-period of the generator 30, illustrated in FIG. 3, a current 31 passing through the load, $Z_0$, is equal to $V_S/2Z_0$ Amperes so that the instantaneous power delivered to the load is $(V_S)^2/4Z_0$ Watts. During a positive half-period 32 of the square-wave cycle, the current 31 is positive and equal to the peak voltage $V_S$, divided by the total circuit resistance $2Z_0$ and a voltage 33 across the load is one half of the peak voltage, $V_S$ Volts.

Figure 4:
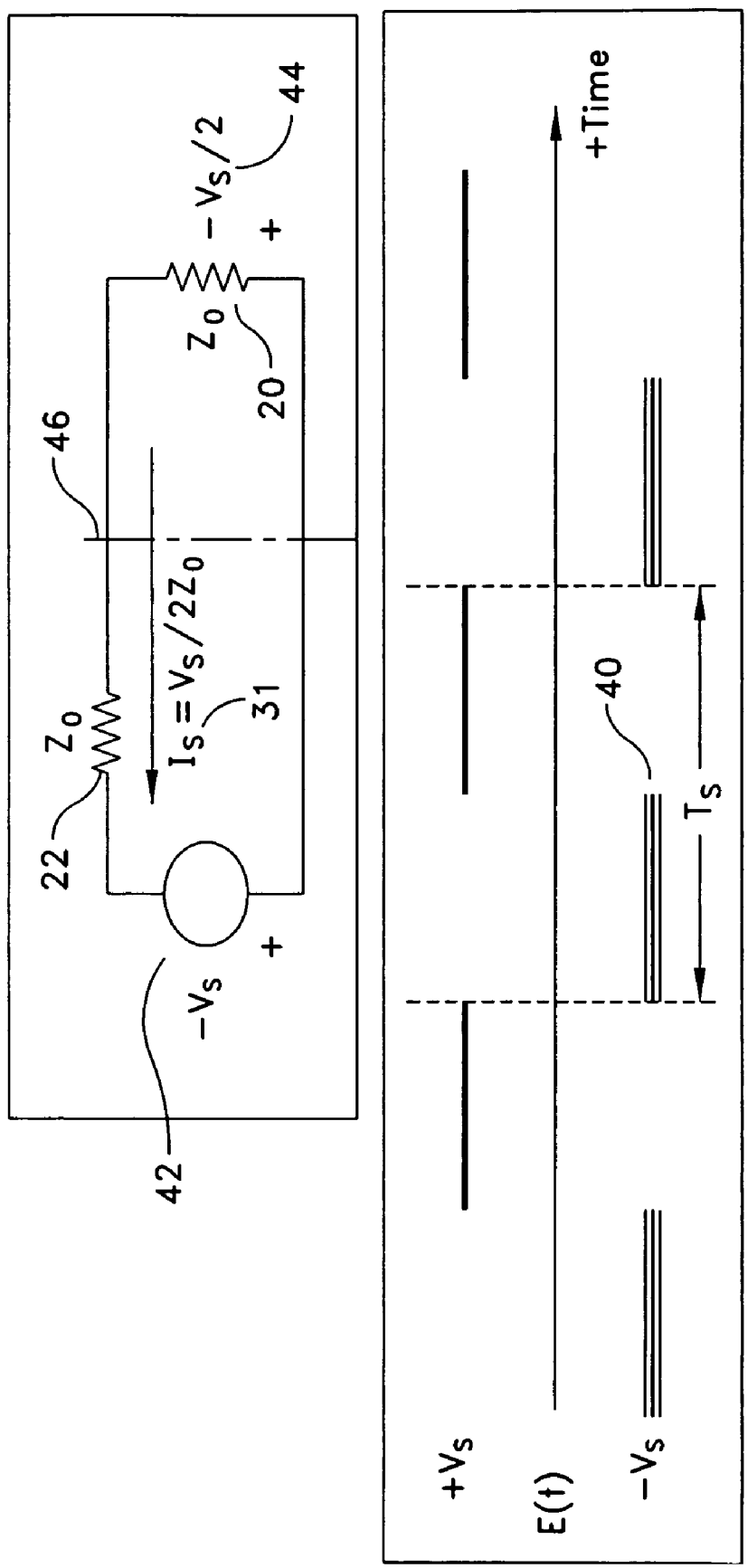
FIG. 4 depicts a square-wave source, negative half period.

During a negative half-period 40 of the generator, illustrated in FIG. 4, the instantaneous power delivered to the load, $Z_0$, is the same, $(V_S)^2/4Z_0$ Watts, even though the current 31 flows in the opposite direction. The current 31 is positive and equal to a peak voltage, $-V_S$ (42) divided by the total circuit resistance and a voltage 44 across the load resistor 20 is one half of the peak voltage, $-V_S$. Thus, the average power is equal to the instantaneous power and is defined as $P_{MAX}=(V_S)^2/4Z_0$ Watts, which is the maximum power available from the source. Thus terminated, the generator is optimally loaded because the generator is delivering a maximum available power to the load, $Z_0$.

Energy Efficient Square-Wave Generator

The disclosed design uses inductors and capacitors as energy storage elements. It is well known to those ordinarily skilled in the art that energy is lost when an abrupt change in capacitor voltage or an abrupt change in inductor current occurs. Under steady state conditions, within the disclosed square-wave generator, inductor current and capacitor voltage remain essentially constant so that transients of inductor current or capacitor voltage do not occur when the square-wave changes polarity.

"Steady state" operating conditions are the operating conditions under which the disclosed circuit would normally be used. When the circuit of the disclosure is initially energized and the switch begins operation, the current through the inductor and the voltage across the capacitor are both zero. A transient state exists until the current of the inductor and voltage of the capacitor have become stable. At this time and afterwards, the operating conditions are described as "steady state".

Inductor voltage and capacitor current are each subjected to abrupt changes as the square-wave polarity changes. Even though these abrupt changes are allowable with ideal components, the parasitic capacitance of the inductor and the parasitic inductance of the capacitor will degrade ideal operation and decrease observed efficiency. These parasitic effects are not addressed in this disclosure because, in good-engineering practice, these effects only minimally degrade performance.

Figure 5:
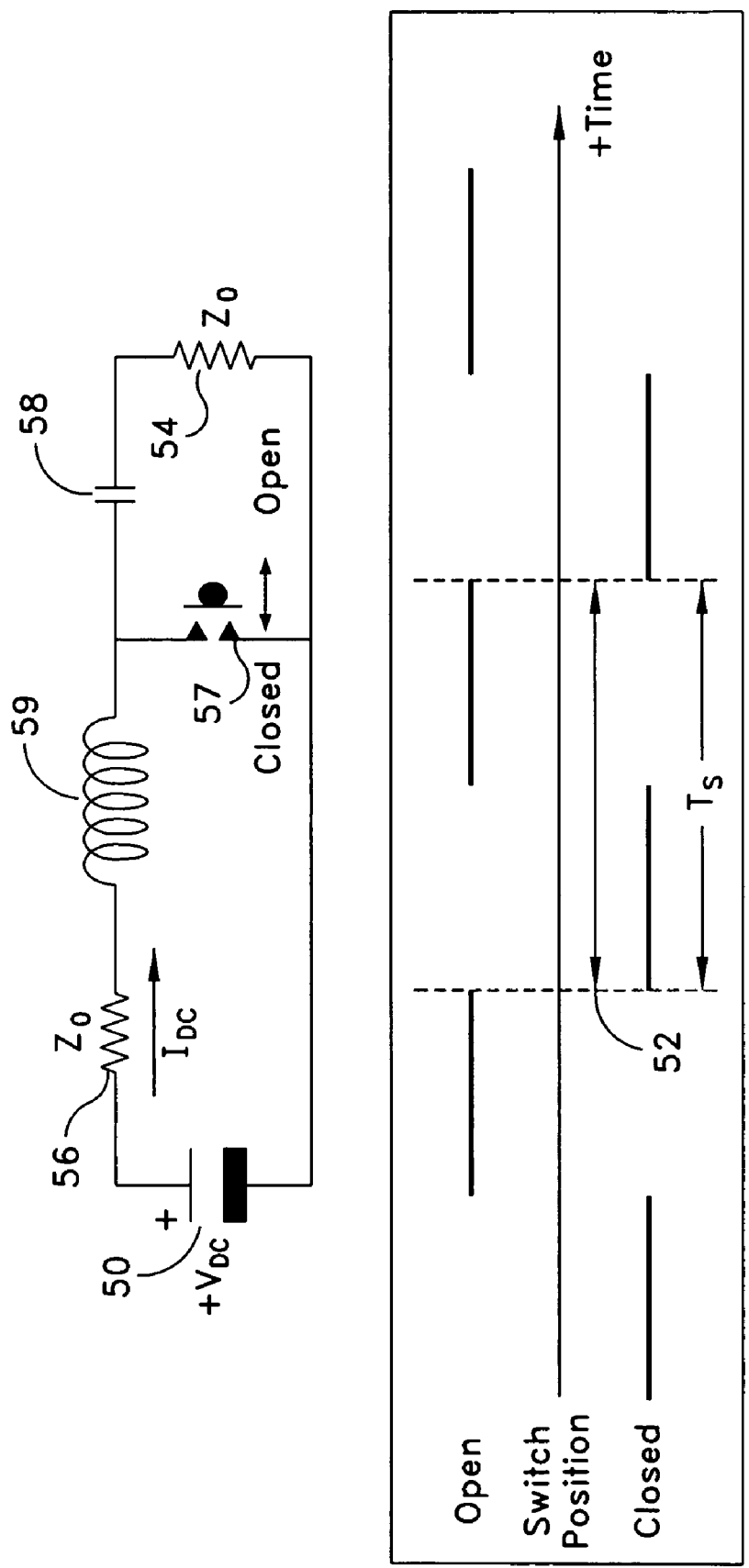
FIG. 5 depicts an energy efficient square-wave generator.

The circuit illustrated in FIG. 5 may be used to convert a DC source 50 into a square-wave 52 driving a load resistor 54 which is equal to the internal impedance 56 of the DC source. In the figure, a switch 57 periodically opens and closes causing a square-wave of current to pass through the load resistor 54.

A transient state occurs when the switch 57 is first initialized. The transient state lasts until the voltage across a capacitor 58 and the current through an inductor 59 each reach a steady state condition. Assuming ideal components, the efficiency of the conversion is one hundred percent because the average square-wave power delivered to the load resistor 54 is equal to the maximum DC power available from the DC source. A square-wave is created by the periodic operation of the switch 57 that changes state once each period, $T_S$, of the square-wave 52. The two states of the switch 57 are defined as follows: (1) when the switch is OPEN, the current through the branch containing the switch is zero while the voltage across the branch may assume any value, and (2) when the switch is CLOSED, the voltage across the branch containing the switch is zero while the current through the branch may assume any value. The dwell time in each of the two switch states is the same.

Figure 6:
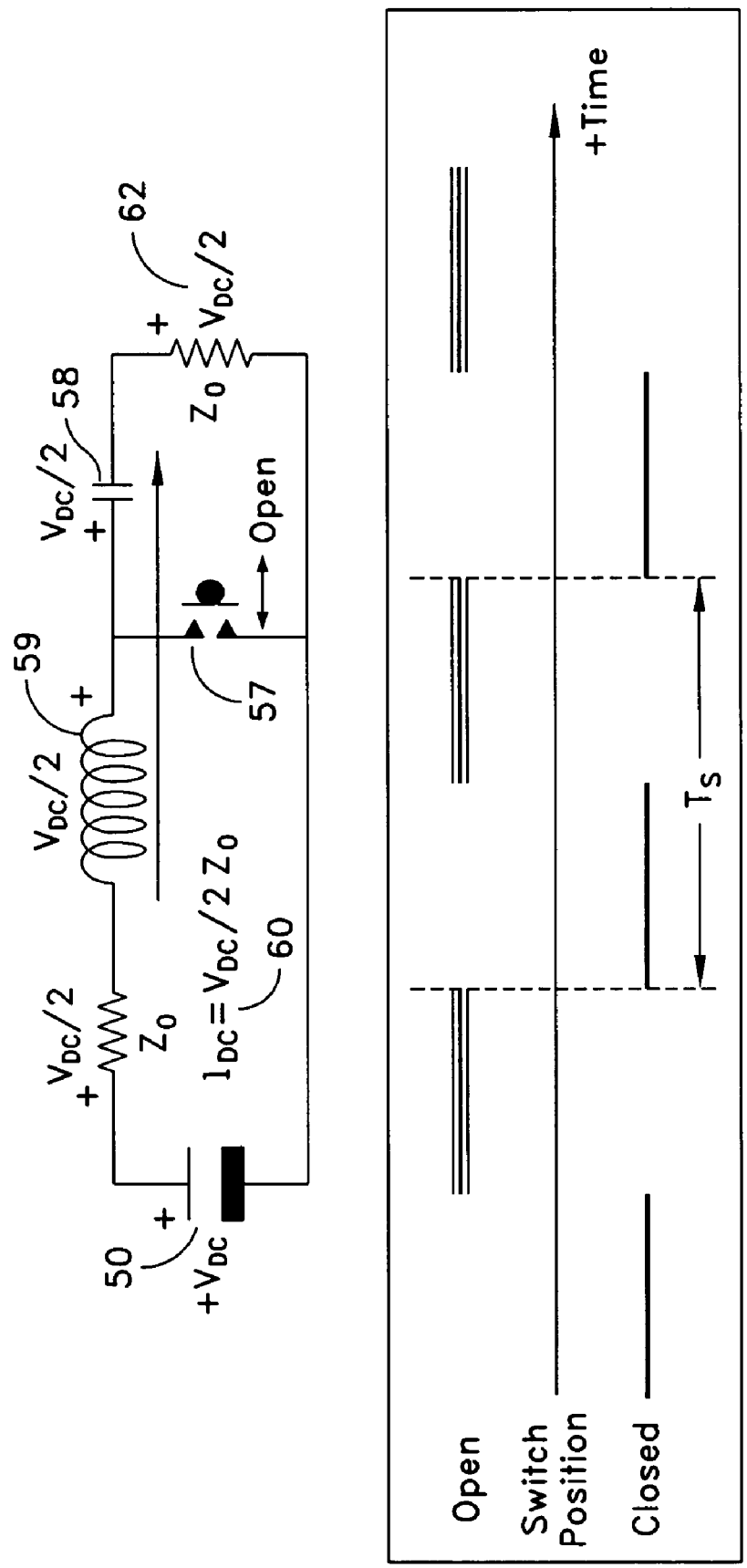
FIG. 6 depicts a square-wave generator, steady state, OPEN.

The steady state OPEN condition of the switch 57 is illustrated in FIG. 6. During a half period, the switch 57 is OPEN so that the current through the branch of the switch is zero. A steady state DC current 60 equal to $V_{DC}/2Z_0$ Amperes passes through the load, $Z_0$, producing a voltage, $V_{DC}/2$ Volts(62). During this half period, energy is supplied to the circuit by the inductor 59 while energy is being stored in the capacitor 58. The voltage across the OPEN switch 57 is $V_{DC}$ Volts.

The average, steady state, energy stored on the inductor 59 is $E_{AVG}=[L(V_{DC})^2]/8(Z_0)^2$ Joules in which "L" is the inductance of the inductor—measured in Henrys. The energy delivered to the circuit by the inductor 59 during each OPEN condition half period is $E_{DEL}=T_S(V_{DC})^2/8Z_0$ Joules. The choice of value of the inductor 59 is made by observing that the delivered energy, $E_{DEL}$, should be less than ten percent of the average energy, $E_{AVG}$. This will be true if the inductance is more than ten times greater than the product $Z_0T_S$. Thus, $L>10\ Z_0T_S$ is required. During the OPEN condition of the switch 57, the voltage across the branch of the switch is $V_{DC}$ Volts.

Figure 7:
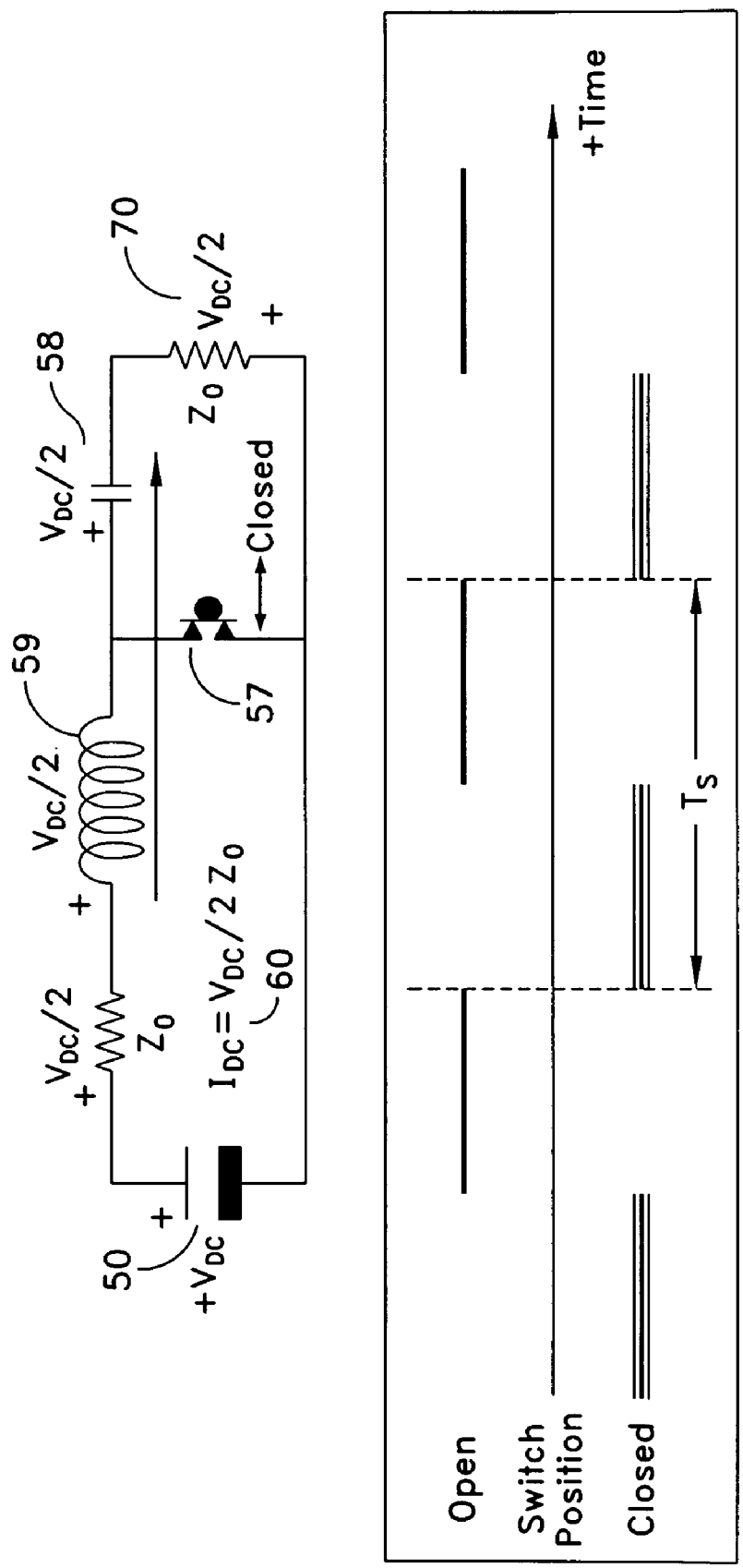
FIG. 7 depicts a square-wave generator, steady state, CLOSED.

The steady state CLOSED condition of the switch 57 is illustrated in FIG. 7. During this half period, the switch 57 is CLOSED so that the voltage is zero across the branch of the switch. The steady state current 60 equal to $V_{DC}/2Z_0$ Amperes reverses through the load $Z_0$, producing a voltage $-V_{DC}/2$ Volts (70). During this half period, energy is supplied to the circuit by the capacitor 58 while energy is being stored in the inductor 59. The current through the CLOSED switch 57 is $V_{DC}/Z_0$ Amperes, which is twice the steady state DC current supplied by the DC source 50.

The average, steady state, energy stored on the capacitor 58 is $E_{AVG}=C(V_{DC})^2/8$ Joules in which "C" is the capacitance of the capacitor—measured in Farads. The energy delivered to the circuit by the capacitor 58 during each CLOSED condition half period is $E_{DEL}=T_S(V_{DC})^2/8Z_0$ Joules, which is the same as the energy delivered by the inductor 59 during each OPEN condition half period. The choice of value of the capacitor 58 is made by observing that the delivered energy, $E_{DEL}$, should be less than ten percent of the average energy, $E_{AVG}$. This will be true if the capacitance is ten times greater than the ratio $T_S/Z_0$. Thus, $C>10\ T_S/Z_0$ is required.

The constraints on the inductance, L, and the capacitance, C, result in a constraint of the period, $T_S$, of the square-wave. This constraint requires that $T_S$ is less than $(1/10)(LC)^{1/2}$, which defines a high-pass behavior with a lower cutoff frequency equal to $10/(LC)^{1/2}$. The high-pass behavior predicts that the disclosed concept can operate at any frequency greater than the lower cutoff frequency. Those skilled in the electronic arts will understand that, in practice, the high frequency behavior will be limited by the parasitic inductance of the capacitor and the parasitic capacitance of the inductor. It follows that the actual operational bandwidth of any embodiment of the disclosed concept will be determined by the quality of the components chosen for the embodiment.

Figure 8:
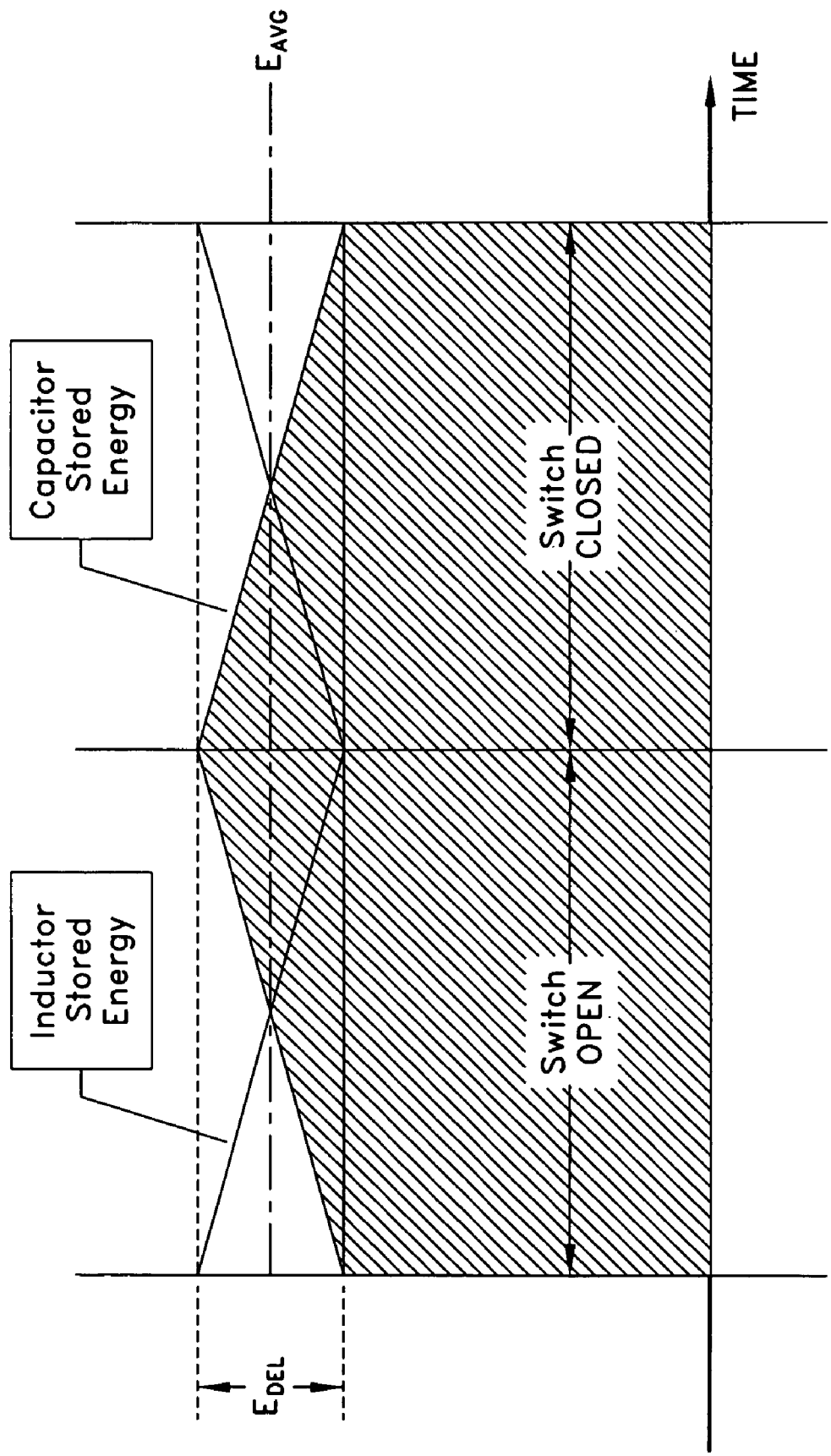
FIG. 8 depicts a square-wave generator, steady state energy exchange.

Energy balance is achieved if the ratio of the element values, L and C, are chosen such that $(L/C)=(Z_0)^2$. The average energy stored on each element is the same. The energy exchange during each period of steady state operation is illustrated in FIG. 8. The graph of the figure depicts the time variation of the energy stored on the capacitor 58 and the inductor 59 illustrated in FIG. 5, FIG. 6 and FIG. 7. During each half period, energy is delivered to the circuit by either the capacitor 58 or inductor 59 or while the energy stored on the other component is increasing. During the next half period, the process reverses. The graph is based on an assumed condition that $E_{DEL}<10\ E_{AVG}$. Only one period is illustrated because, in the steady state, each period is identical to every other period.

By comparing FIG. 6 with FIG. 7, the effects caused by the CLOSING operation of the switch 57 are shown. The instant that the switch 57 closes, the voltage across the inductor 59 changes polarity, but not magnitude, while the current through the capacitor 58 and the load impedance changes direction, but not magnitude. Both of these instantaneous changes are permissible by the boundary conditions imposed by the circuit components and no transient behavior occurs as a result of the CLOSING operation of the switch 57. The current through the inductor 59 and the voltage across the capacitor 58 do not change when the switch 57 CLOSES.

In one embodiment, the switch used to implement the square-wave generator circuit would be a transistor collector-emitter circuit. A small amount of energy would be necessary to power a switch driver to provide the transistor base-emitter drive current, which may less than one percent of the peak collector-emitter current, $V_{DC}/Z_0$ Amperes, that flows in the switch branch when the transistor is switched into saturation.

Energy Efficient [Square-Wave]-to-DC Converter

Figure 9:
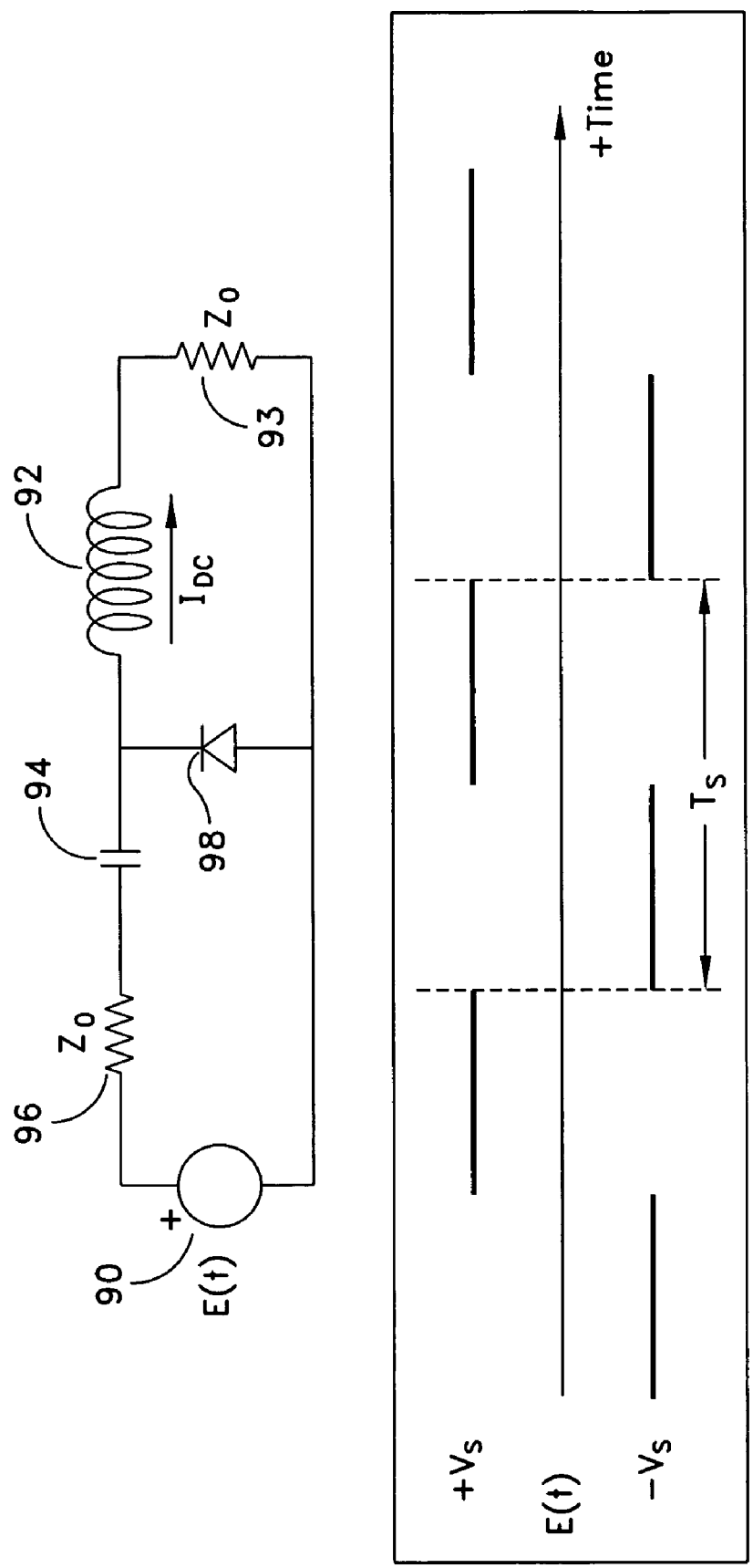
FIG. 9 depicts a [square-wave]-to-DC converter circuit.

A [square-wave]-to-DC converter circuit is illustrated in FIG. 9. In the figure, a square-wave source 90 switches periodically between a positive voltage, $V_S$ and a negative voltage, $-V_S$. After a steady state condition is reached, an inductor 92 acts as a constant current source delivering a positive DC current to a load, $Z_0$ of a load resistor 93.

A transient state occurs when the square-wave source is first initialized. The transient state lasts until the voltage across the capacitor 94 and the current through the inductor 92 each reach a steady state condition.

The passive circuit requires the capacitor 94 and the inductor 92 for energy exchange. The square-wave source 90 and a source impedance 96 represent the Thevenin-Equivalent of a transmission line being driven by a square-wave generator, as described previously. If the inductor 92, the capacitor 94, and a diode 98 of the converter circuit are assumed to be ideal, then the efficiency of the converter circuit is one hundred percent. That is, the DC power delivered to the load resistor 93 is equal to the maximum power available from the Thevenin-Equivalent generator.

The square-wave is converted to direct current by a non-linear property of the diode 98 that, in one state, permits an undefined current to flow through the branch of the diode in only one direction while the voltage across the branch containing the diode is zero and that, in a second state, permits an undefined voltage across the branch in only one polarity while the current through the branch is zero. The operation of the converter circuit in steady state can be described by observing each non-linear state separately. When the polarity of the diode 98 is as illustrated in FIG. 9, the two states correspond to the NEGATIVE half period of the square-wave and to the POSITIVE half period of the square-wave.

Figure 10:
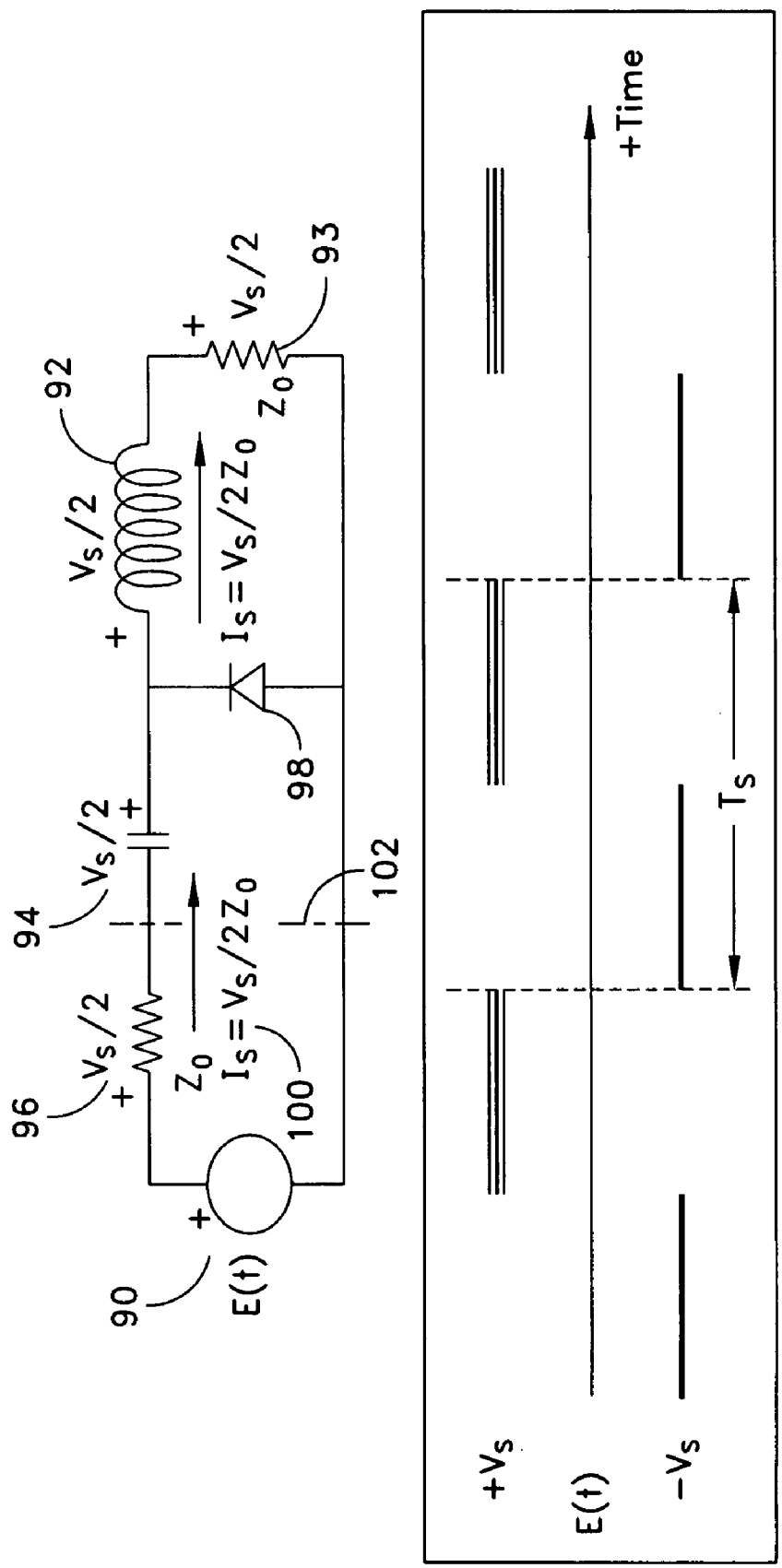
FIG. 10 depicts a [square-wave]-to-DC converter, POSITIVE half period.

The steady state operation of the converter circuit during the POSITIVE half period is illustrated in FIG. 10. During this half period, the square-wave source 90 presents a positive voltage, $V_S$ Volts to the circuit causing a current $V_S/2Z_0$ Amperes (100) to flow in the circuit. The diode 98 is reverse-biased by a voltage equal to $V_S$ Volts so that no current flows in the branch containing the diode. Thus, the current, $I_S$, flows through the load, $Z_0$, generating a voltage $V_S/2$ Volts across the load. During this half period, the capacitor 94 supplies energy to the circuit while the stored energy on the inductor 92 is increasing.

The current through the branch of the diode 98 is zero. Thus, the current 100 driven by the square-wave source 90 flows through the capacitor 94, the inductor 92, and the load resistor 93.

The average, steady state, energy stored on the capacitor 94 is $E_{AVG}=C(V_S)^2/8$ Joules. The energy delivered to the circuit by the capacitor 94 during each POSITIVE half period is $E_{DEL}=T_S(V_S)^2/8Z_0$ Joules. The choice of value of the capacitor 94 is made by observing that the delivered energy, $E_{DEL}$, should be a fraction of the average energy, $E_{AVG}$. This will be true if the capacitance is much greater than the ratio $T_S/Z_0$. Thus, $C>10\ T_S/Z_0$ is required. During the POSITIVE half period of the square-wave, the voltage across the branch of the diode 98 is $V_S$ Volts with a polarity that reverse-biases the diode junction so that no current can flow in the diode branch.

Figure 11:
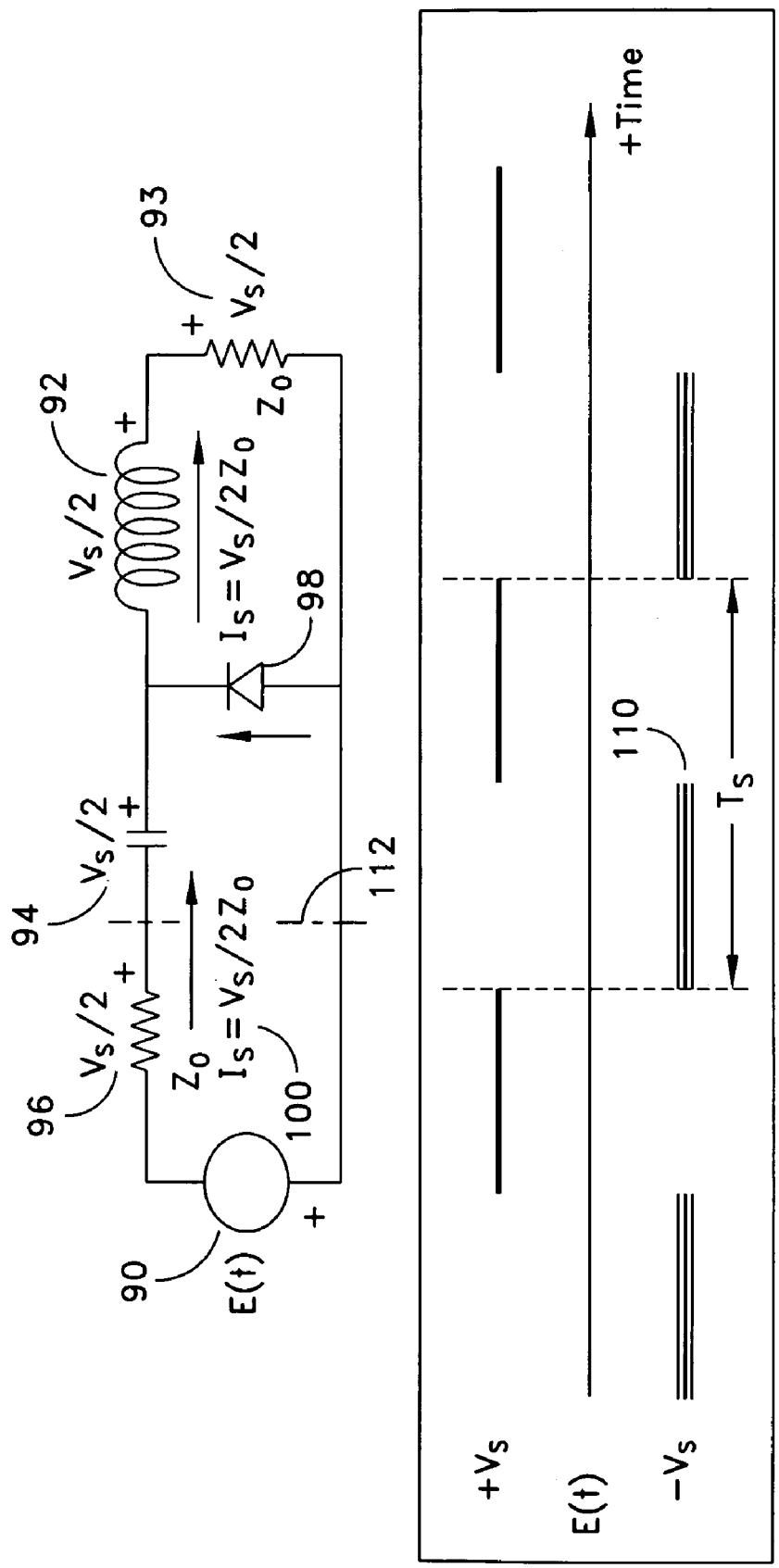
FIG. 11 depicts a [square-wave]-to-DC converter, NEGATIVE half period.

Steady state operation of the converter circuit during a NEGATIVE half period is illustrated in FIG. 11. During this half period, the square-wave source 90 presents a negative voltage, $-V_S$ Volts, to the circuit causing a current $-V_S/2Z_0$ Amperes to flow in the circuit. The diode 98 is forward-biased by a current equal to $V_S/Z_0$ Amperes and the voltage across the branch containing the diode is approximately zero. A current, $I_S$, flows through the load, $Z_0$, generating a voltage $V_S/2$ Volts across the load. During a half period 110, the energy stored on the capacitor 94 is increasing while the inductor 92 supplies energy to the circuit.

The voltage across a branch of the diode 98 is zero and the current through the branch is $V_S/Z_0$ Volts. The average, steady state, energy stored on the inductor 92 is $E_{AVG}=[L(V_S)^2]/8(Z_S)^2$ Joules. The energy delivered to the circuit by the inductor 92 during each NEGATIVE half period is $E_{DEL}=T_S(V_S)^2/8Z_0$ Joules. The choice of value of the inductor 92 is made by observing that the delivered energy, $E_{DEL}$, should be a fraction of the average energy, $E_{AVG}$. This will be true if the inductance is much greater than the product $Z_0T_S$. Thus, $L>10 Z_0T_S$ is required.

The constraints on the inductance, L, and the capacitance, C, result in a constraint on the period, $T_S$, of the square-wave. This constraint requires that $T_S$ is less than $(1/10)(LC)^{1/2}$, which defines a high-pass behavior with a lower cutoff frequency equal to $10/(LC)^{1/2}$. The high-pass behavior predicts that the disclosed concept can operate at any frequency greater than the lower cutoff frequency. Those skilled in the electronic arts will understand that, in practice, the high frequency behavior will be limited by the parasitic inductance of the capacitor and parasitic capacitance of the inductor. It follows that the actual operational bandwidth of any embodiment of the disclosed concept will be determined by the quality of the components chosen for the embodiment.

Figure 12:
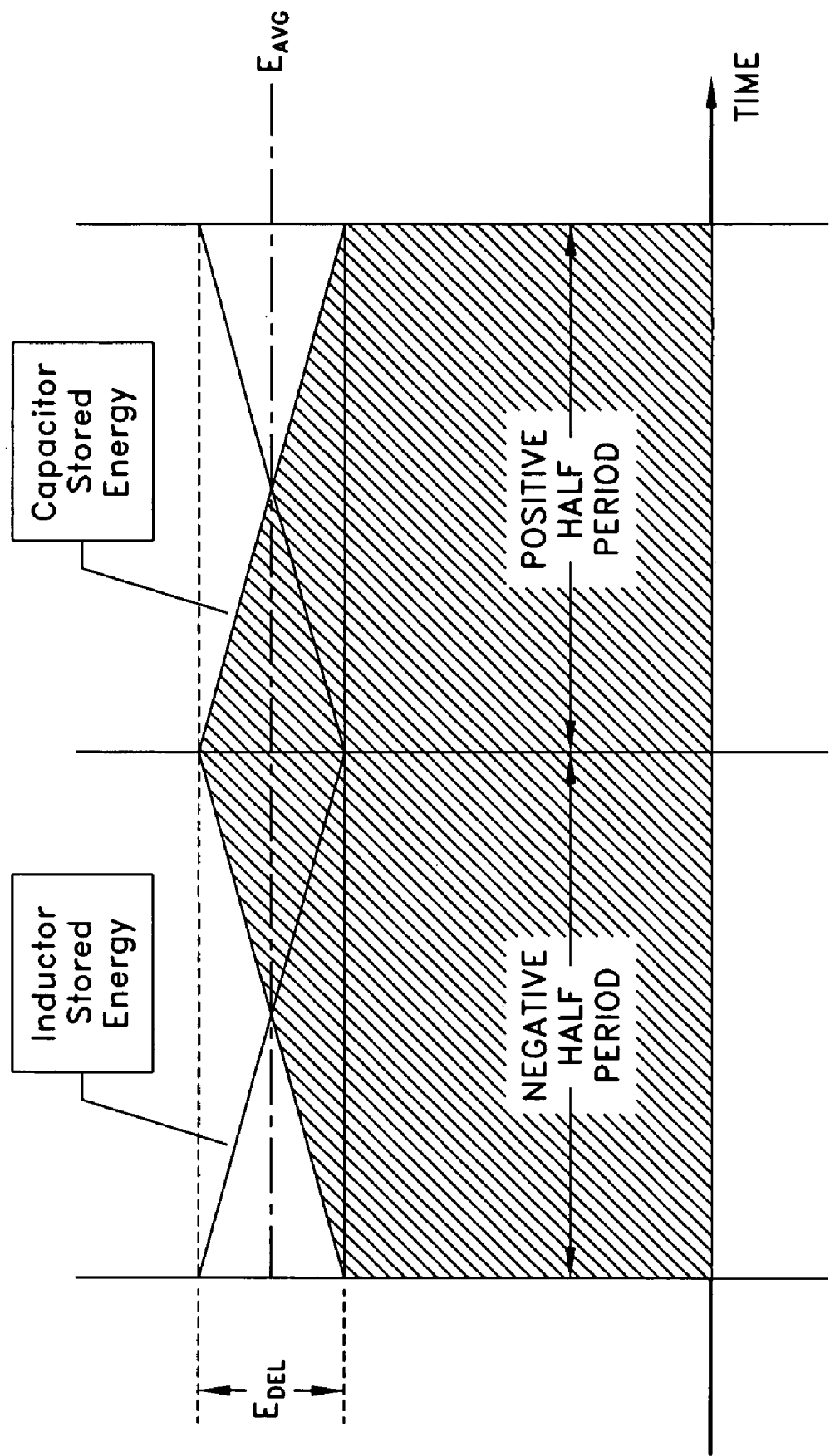
FIG. 12 depicts a DC converter, steady state energy exchange.

Energy balance is achieved if the ratio of the element values, L and C, are chosen such that $(L/C)=(Z_0)^2$. The average energy stored on each element is the same. The energy exchange during each period of steady state operation is illustrated in FIG. 12. The graph in the figure depicts the time variation of the energy stored on the inductor 92 and capacitor 94 of the DC converter illustrated in FIG. 9, FIG. 10 and FIG. 11. During each half period, energy is delivered to the circuit by either the inductor 92 or the capacitor 94 while the energy stored on the other component is increasing. During the next half period, the process reverses. The graph is based on a condition that $E_{DEL}\ll E_{AVG}$. Only one period is illustrated because, in the steady state, each period is identical to every other period.

By comparing FIG. 10 with FIG. 11, the effects caused by the instantaneous change in square-wave polarity from POSITIVE to NEGATIVE are shown. The instant that the square-wave polarity changes, the voltage across the inductor 92 also changes polarity, but not magnitude, while the current through the capacitor 94 changes direction, but not magnitude. Both of these instantaneous changes are permissible by the boundary conditions imposed by the circuit components and no transient behavior occurs as a result of the polarity change. The current through the inductor 92 and the voltage across the capacitor 94 do not change when the square-wave polarity changes and this is also required by their respective boundary conditions. The current through the load resistor 93 is the same as the current through the inductor 92 and does not change in either polarity or magnitude. Thus, the load at the load resistor 93 experiences Direct Current.

By comparing FIG. 10 with FIG. 3 and FIG. 11 with FIG. 4, the converter circuit, illustrated in FIG. 9 is indistinguishable from a resistive termination, $Z_0$—when the excitation is a square-wave. Consider a boundary 102 shown in FIG. 10 and a boundary 34 shown in FIG. 3. The Thevenin-Equivalent circuit to the left of the boundary 102 in FIG. 10 is identical to the Thevenin-Equivalent circuit to the left of the boundary 34 in FIG. 3.

The current 100 crossing the boundary 102, from the Thevenin-Equivalent square-wave generator to the [square-wave]-to-DC converter circuit is identical to the current 31 crossing the boundary 34 from the Thevenin-Equivalent generator to the matched termination, $Z_0$. The voltage across the boundary 102 is $V_S/2$, which is identical to the voltage across the boundary 34. Thus, it can be concluded that, during the POSITIVE half cycle of the square-wave, the converter circuit is indistinguishable from a resistor having a value $Z_0$.

Now, consider a boundary 112 shown in FIG. 11 and a boundary 46 shown in FIG. 4. The Thevenin-Equivalent circuit to the left of the boundary 112 in FIG. 11 is identical to the Thevenin-Equivalent circuit to the left of a boundary 46 in FIG. 4.

The current 100 crossing the boundary 112, from the converter circuit to the Thevenin-Equivalent generator is identical to the current 31 crossing the boundary 46 from the matched termination, $Z_0$, to the Thevenin-Equivalent generator. The voltage across the boundary 112 is $-V_S/2$, which is identical to the voltage across the boundary 46.

During the NEGATIVE half cycle of the square-wave, the converter circuit is indistinguishable from a resistor having a value $Z_0$.

After reaching a steady state condition, the converter circuit of FIG. 9 is indistinguishable from a resistive termination, $Z_0$, when driven by a square-wave. This property allows the converter circuit to be used as a matched termination for a uniform transmission line of any length with a transmission-line characteristic impedance equal to $Z_0$ when the uniform transmission line is driven by a square-wave source. This property is illustrated in FIG. 13.

Figure 13:
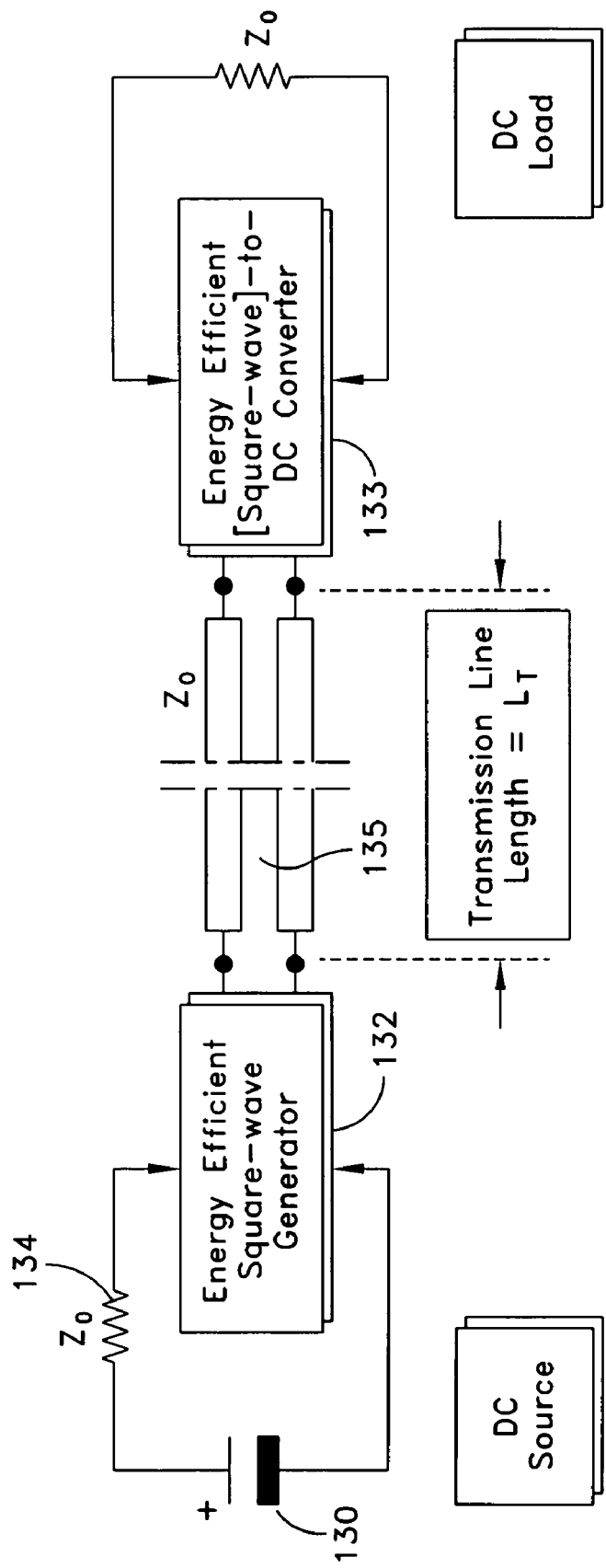
FIG. 13 depicts a power-transmission model.

In FIG. 13, power from a DC source 130 is transmitted over a distance $L_T$ by using an energy efficient square-wave generator 132 and an energy efficient [square-wave]-to-DC converter 133. The source impedance of the generator 132, a characteristic impedance 134 of a transmission line 135 and the DC load impedance are each equal to $Z_0$.

The transmission line 135 may lengthy since the converter 133 presents a matched termination to the transmission line.

Figure 14:
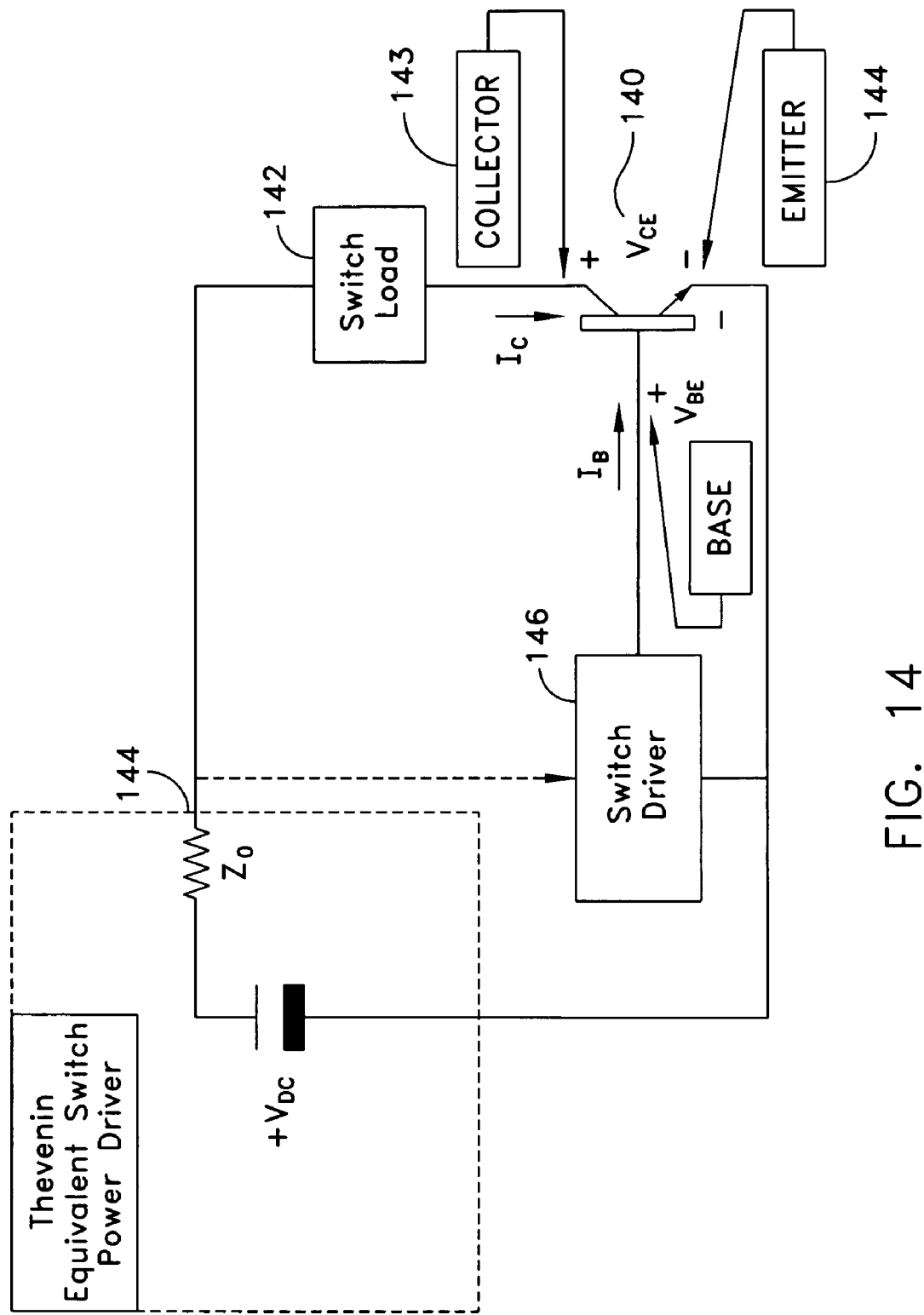
FIG. 14 depicts a transistor shunt-switch modulator system.

In FIG. 14, a NPN transistor 140 is shown which switches between an OPEN circuit and a SHORT circuit to modulate the current through a switch load 142. A Thevenin-Equivalent power supply 144 represents the power source that supplies the load current to the switch load when the transistor is switched ON by a switch driver circuit 146. Power from the DC source is switched through the load 142 by the action of the transistor 140. The switch-driver circuit 146 causes the transistor 140 to periodically switch from a conducting state to a non-conducting state. If the parameters of the switch driver circuit are chosen correctly, then the base current in the switch ON condition and the reverse base-emitter bias in the OFF condition are controllable for efficient and reliable operation.

The switch-driver subsystem or sub-circuit may be powered from a common power supply. The design is based on the fact that NPN-transistor base-emitter-junction operating characteristics can be represented by a PN-junction diode. The base-emitter junction has a low reverse breakdown voltage and can be destroyed if the switch driver exceeds the reverse breakdown voltage. Furthermore, the maximum load current, which is the collector current of the transistor is BETA times the base current which is provided by the switch-driver 146. Thus, the design of the switch-driver 146 comprises a circuit that is capable of delivering a controlled forward base current to switch the transistor ON and a controlled reverse base-emitter bias to turn the transistor OFF without exceeding the reverse breakdown of the base-emitter junction. The details of the switch driver circuit are described in the next section.

A Method for Driving an NPN-Transistor Used as a Periodic Switch in a Common-Emitter Application As noted, this section focuses on an embodiment of a switching method. Other embodiments are recognizable to those skilled in the art and extend to switches that use PNP transistors and/or appear in common-collector, common-base, and/or floating applications. Other bi-mode switching devices may be used with the disclosed driver method. For example, any device that requires a precisely controlled current in one mode and a precisely controlled voltage in a second mode, as is the case with a PN-junction diode that is switched between a precisely controlled forward current, which defines an ON mode, and a precisely controlled reverse-bias voltage, which defines an OFF mode.

Figure 15:
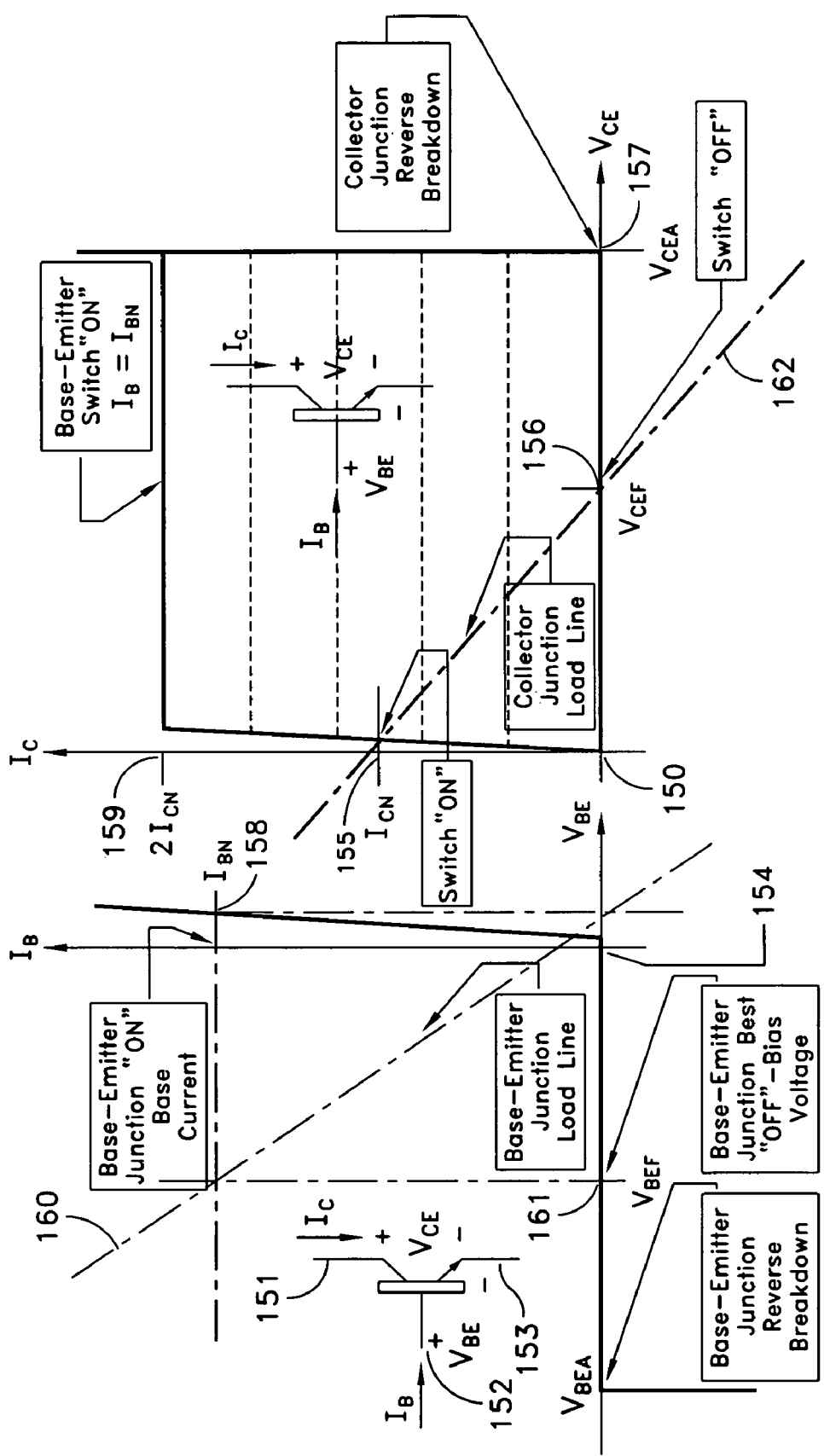
FIG. 15 depicts switching NPN-transistor junction characteristics.

In FIG. 15, the properties that characterize the behavior of a typical NPN transistor are illustrated. A collector-emitter characteristic 150 illustrates the relationship between a collector-current 151 and a collector-to-emitter voltage 152. The non-linear characteristic is parameterized in values of a base current 153. A base-emitter characteristic 154 is that of a PN junction diode.

In the graphic on the left side of FIG. 15, the terminal relationship between the transistor base current, $I_B$, and the transistor base-emitter voltage, $V_{BE}$ are illustrated. When the junction is forward-biased, the transistor base current flows from the base to the emitter and the base emitter voltage, $V_{BE}$, is usually smaller than 0.6 Volts. When the junction is reverse-biased, the base-emitter current is usually less than a (negative) few micro-Amps until the reverse-bias voltage reaches the junction avalanche voltage, $V_{BEA}$. If the avalanche voltage were to be exceeded, then the current may quickly become large and the junction may self-destruct, destroying the transistor. This situation is a common cause of failure in power transistors used as high-frequency periodic switches.

In the graphic on the right side of the figure, the collector-emitter characteristics of a typical NPN transistor are illustrated. This characteristic illustrates the relationship between the collector-emitter current, $I_C$, and the collector-emitter voltage, $V_{CE}$.

When used as an amplifier, the transistor is biased so that an operation takes place in a region where the collector-emitter current is virtually independent of the collector-emitter voltage. When used as a switch, the transistor is biased so that, in an ON-state 155, the collector-emitter voltage is approximately equal to zero and is almost independent of the collector current and, in an OFF-state 156, the collector current is nearly equal to zero while the collector-emitter voltage can range from small positive values to the collector avalanche breakdown voltage, $V_{CEA}$ (157). If the collector avalanche breakdown voltage 157 is exceeded, the transistor may self-destruct.

The ON-state collector characteristic is determined by base-current magnitude, which is established by the switch driver. The ON-state base current is $I_{BN}$ (158). Thus, the collector-emitter voltage will remain in saturation until the collector current reaches a value of $2I_{CN}$, which is BETA times the base current $I_{BN}$.

The ON-state base current 158 is chosen so that the collector junction will remain in saturation until a current 159 is reached that is approximately twice the anticipated maximum switch ON-state current 155.

Also in this example, a base-emitter OFF-state reverse bias is chosen to be approximately one half of the avalanche breakdown voltage, $V_{BEA}$. The corresponding collector-emitter OFF-state voltage operating point is chosen to be approximately one half of the collector avalanche breakdown voltage, $V_{CEA}$ (157).

A base emitter junction load line 160 is determined as the diagonal of a rectangle, which is defined by the ON-state operating point and an OFF-state operating point 161. The reciprocal slope of the load line 160 defines the switch-driver circuit characteristic impedance, $Z_{BE}$ which is described in connection with FIG. 16.

In FIG. 15, a collector emitter load line 162 is defined by the mean ON-state collector current $I_{CN}$ (155) and the mean OFF-state collector-emitter voltage, $V_{CEF}$ (156). The slope of the collector load line defines the collector circuit characteristic impedance, $Z_O$, which is described in connection with FIG. 16.

Figure 16:
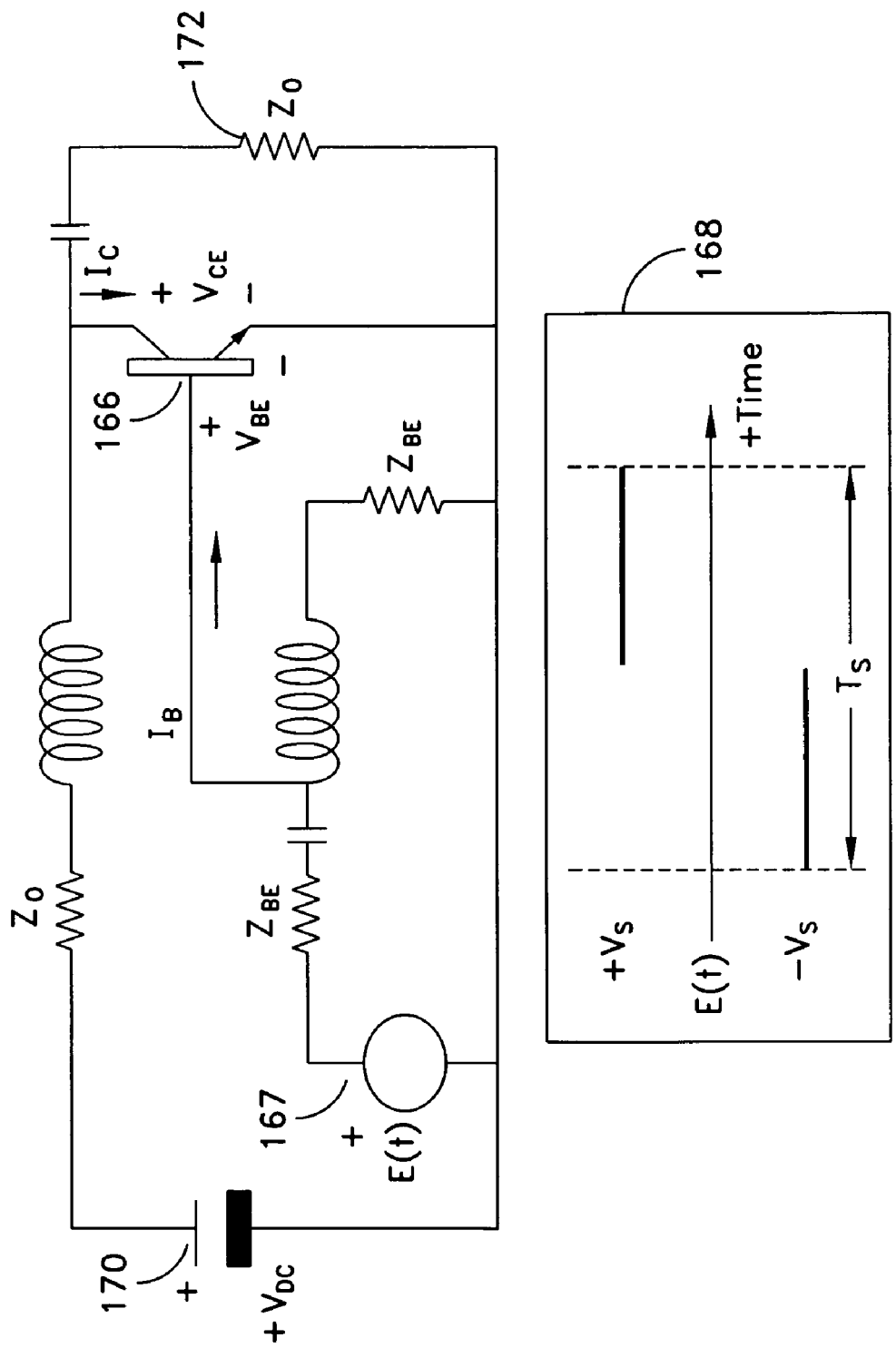
FIG. 16 depicts a switching NPN-transistor circuit used to generate a square-wave source.

In FIG. 16, a NPN switch replaces the switch icon in FIGS. 5, 6 and 7. The NPN transistor base circuit is driven by a switch driver circuit that is configured as described in FIG. 9, 10 and 11 wherein the diode is replaced by the base-emitter junction of the NPN transistor. Thus, the switch driver circuit is practically identical to the energy efficient [square-wave]-to-DC converter as previously described in the "Energy Efficient [Square-Wave]-to-DC Converter" section, except that the base-emitter junction of a NPN transistor 166 replaces the diode 98. A square-wave source 167 switches periodically between a positive voltage, $V_S$, and a negative voltage, $-V_S$, as illustrated in an inset 168.

The switching-transistor base-emitter junction bias points can be precisely set by correctly choosing the switch driver voltage amplitude, $V_S$, and the switch driver characteristic impedance, $Z_{BE}$. The characteristic impedance is determined from the reciprocal slope of the base-emitter load line 160 and is $Z_{BE}=V_{BEF}/I_{BN}$. Furthermore, $V_S=I_{BN}\times Z_{BE}$. These conditions establish the specified base-emitter circuit operating conditions that establish the ON-state and OFF-state of the transistor switch. The power dissipated in the switch driver circuit is $P_{DSD}=(I_{BN}\times V_{BEF})/4$.

The frequency-domain behavior of the switch driver circuit is high-pass. As previously described, an inductor and a capacitor are used as energy storage elements and a low-frequency cutoff is described as the operating frequency where the square-wave period, $T_S$, is such that $T_S=(1/10)(LC)^{1/2}$. If ideal components were used for all circuit elements, there would be no upper cutoff frequency. In practice, the upper cutoff frequency is determined by the parasitic elements of the non-ideal circuit components and it is anticipated that the upper cutoff frequency will be several orders of magnitude greater than the lower cutoff frequency. Thus, switch-driver and switching transistor operation extending from 5-MHz to 500-MHz should be achievable with available components.

An Energy Efficient Amplitude-Phase-Frequency Modulator

Figure 17:
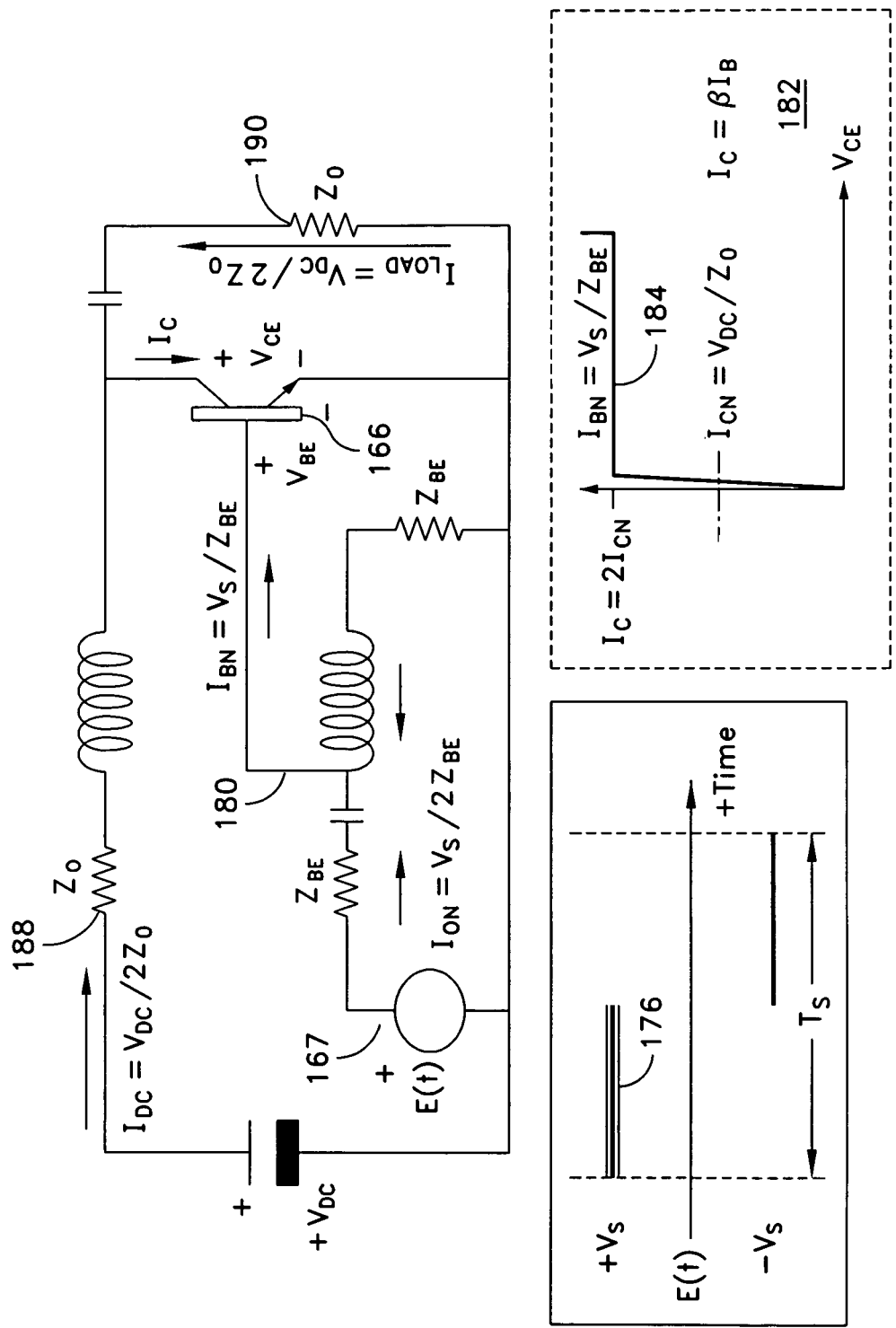
FIG. 17 depicts a switching NPN-transistor ON-state circuit condition.
Figure 18:
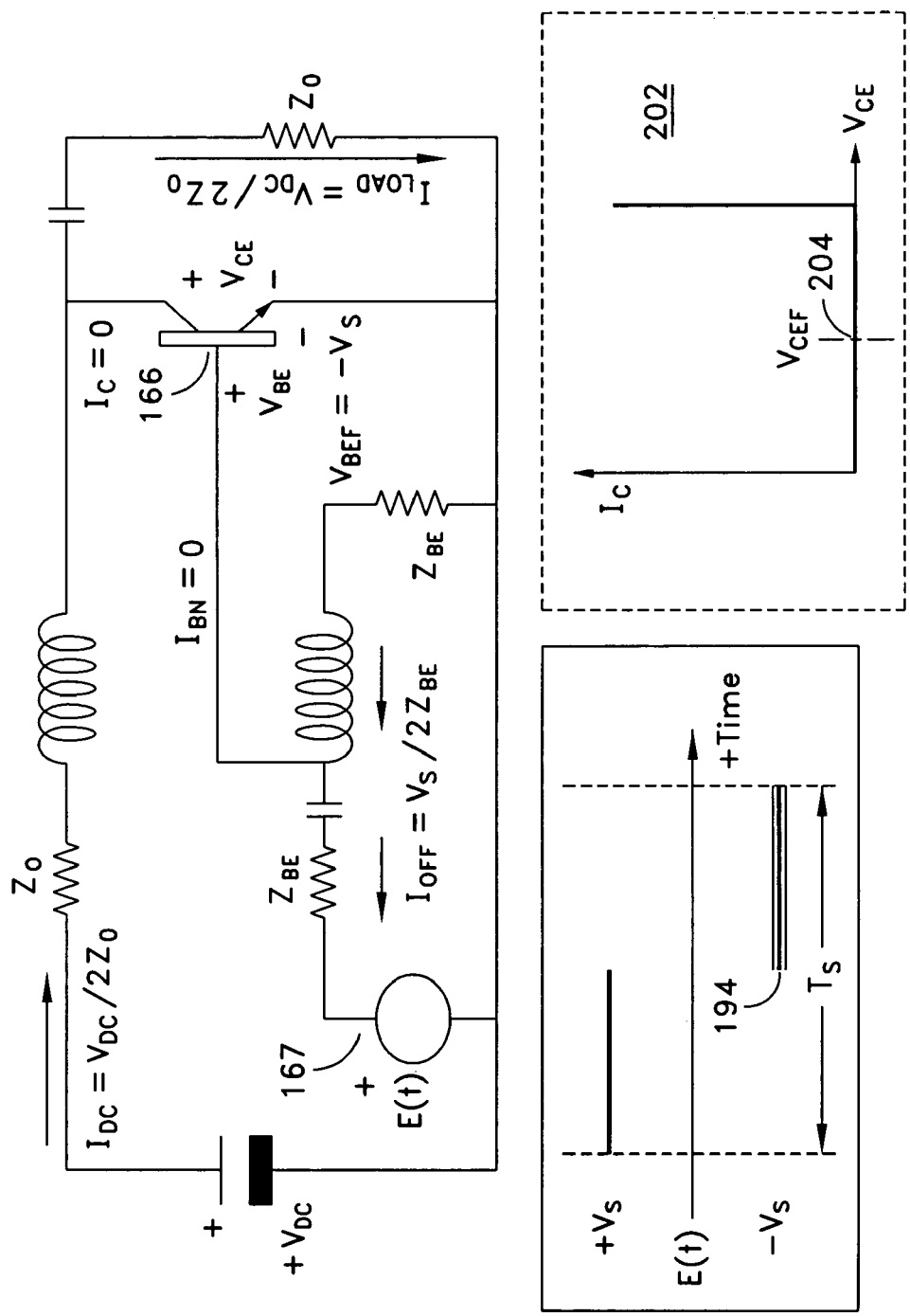
FIG. 18 depicts a switching NPN-transistor OFF-state circuit condition.

The remainder of the components in FIG. 16 comprise an energy efficient square-wave generator, except that the NPN transistor 166 replaces the switch 57 illustrated in FIG. 5. Thus, the circuit of FIG. 16 comprises a power modulator that efficiently converts a stable or slowly varying positive voltage source 170 to a high frequency square-wave. The slowly varying positive voltage source could, for example, be the voltage output of a photo-voltaic solar panel. The square-wave is delivered to a load impedance $Z_0$ at a load resistor 172, which may, for example, be an antenna, a transmission line or another system. FIGS. 17 and 18 illustrate two operating states of the modulator.

In FIG. 17, the ON-state of the transistor switch 166 is illustrated, which is effected by a POSITIVE value $V_S$ (176), of the driver source, E(t) (167). The transistor base current, which is controlled by a driver circuit (180), is $I_{BN}=V_S/Z_{BE}$ Amperes, as predicted in the section entitled "A Method for Driving A NPN-Transistor Used as a Periodic Switch in an Common-Emitter Application". The transistor collector characteristic, which corresponds to the established transistor base current, is illustrated in Inset 182.

As the collector current increases from zero, the collector-emitter voltage remains in saturation near zero volts until the collector current reaches a value, $2I_{CN}$ (184) Amperes, which is Beta times the transistor base current, $I_{BN}$. It is an industry standard practice to refer to the ratio of transistor collector current to transistor base current as the "Beta" of a transistor. If the transistor collector-emitter voltage $V_{CE}$, is increased beyond the saturation value, the collector current remains constant at the value determined by the base current until the collector-emitter voltage exceeds the collector-junction avalanche breakdown voltage. The design constraints of the disclosed modulator require that the selected switch-transistor collector junction remains in saturation during the ON-state. Thus, the ON-state collector current is bounded by $0 < I_C < \beta I_{BN}$. The source 167 is in the positive value 176, which drive the switching-transistor base current to the chosen bias level, $I_B = V_S/Z_{BE}$ Amperes.

The voltage amplitude of the square-wave is directly related to the source voltage 170. If the source voltage 170 is modulated for a time varying signal, then the amplitude of the square-wave will be modulated by the same time varying signal. The time varying signal may contain information such as an analog voice communication or the digital data stream. In this way, the disclosed modulator can be used to create an amplitude modulated, AM, carrier such as the AM carriers used in the AM broadcast band from 500 kHz to 1.5 MHz. It will be seen that the voltage source 170 must remain positive at all times so that the peak value of the information bearing modulating signal cannot exceed the average value of the source voltage.

If the disclosed modulator is used for amplitude modulation, then the modulation will cause the switch-transistor ON-state collector current to vary in proportion to the modulation amplitude. A modulator design constraint that permits maximum peak-to-peak amplitude modulation is to adjust the circuit parameters so that the switch-transistor collector current that corresponds to the average value of the amplitude modulation is one half of the maximum permitted ON-state collector current. Thus, the average ON-state collector current is constrained by $I_{CN} = \beta I_{BN}/2$ Amperes.

In FIG. 17, an average value of the amplitude modulation is represented by $V_{DC}$. Thus, the choice of modulator characteristic impedance, $Z_0$ (188, 190), is set by the constraint equation $I_{CN} = V_{DC}/Z_0$ Amperes, which also establishes the switch-transistor collector load line (162 in FIG. 15) and determines the OFF-state collector emitter voltage, $V_{CEF}$, which is equal to the average value, $V_{DC}$ Volts.

In FIG. 18, the OFF-state of the transistor switch 166 is illustrated. The OFF-state is effected by a NEGATIVE value, $-V_S$, (194) of the driver source 167, E(t). A switch transistor base current is essentially zero while a base-emitter junction is reverse-biased at a level, $-V_S$. The transistor OFF-state collector characteristic is illustrated in an Inset 202. The collector current remains essentially zero for all values of collector-emitter voltage less than the collector-junction breakdown voltage, $V_{CEA}$. An average OFF-state collector-emitter voltage, $V_{CEF}$ (204), is equal to an average value of an amplitude-modulation voltage, $V_{DC}$.

Under perfect conditions, the average OFF-state collector voltage $V_{CEF}$ (204), would be less than, or equal to, one-half of the collector-junction breakdown voltage $V_{CEA}$. However, it is possible to optimize the modulator design by choosing an ON-state base current that will simultaneously establish the two conditions (1) $I_{CN} = \beta I_{BN}/2$, and (2) $V_{CEF} = V_{CEA}/2$. Since $I_{CN} = V_{CEF}/Z_0$, these two conditions together require that $I_{BN} = V_{CEA}/(\beta Z_0)$. The source 167 is in the negative value 194, which drives the switching-transistor base current to zero and the base-emitter reverse-biases to the chosen bias level, $V_{BW}, V_{BEFF} = -V_S$.

Figure 19:
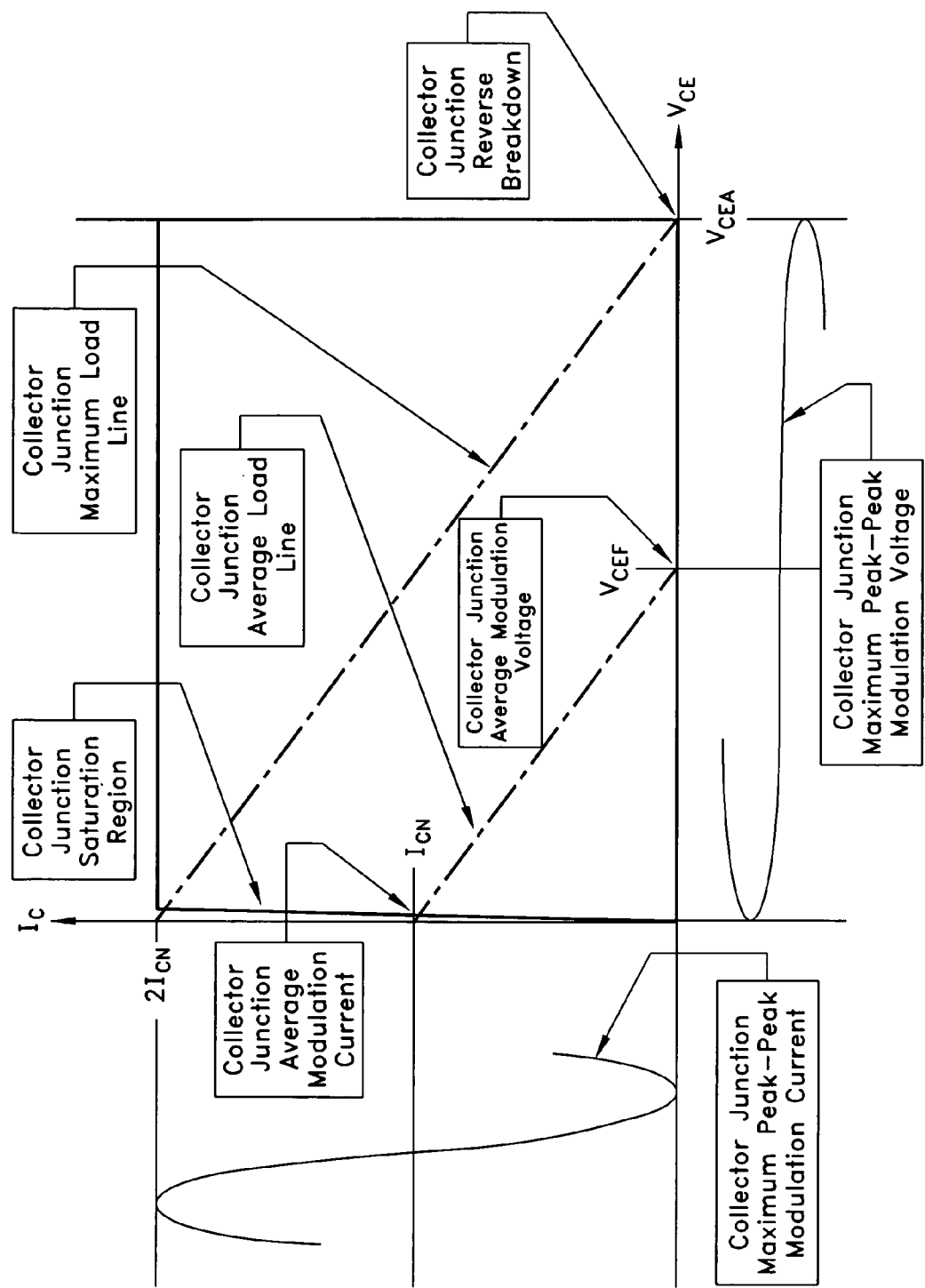
FIG. 19 depicts amplitude modulator switch constraints.

Assuming that it is possible to optimize the modulator with respect to modulation voltage and current amplitudes, the resulting switching transistor collector circuit conditions are summarized in FIG. 19. The peak-to-peak collector current modulation is approximately equal to the maximum saturation current while the peak-to-peak collector voltage modulation is simultaneously almost equal to the collector breakdown voltage. This results in a maximum utilization of the switch-transistor dynamic characteristics as an amplitude modulator. The optimized modulator circuit takes advantage of the maximum collector voltage and current swings permitted by the switching transistor.

By comparing FIG. 17 and FIG. 18, the switch driver causes a polarity modulation of the current through the load $Z_0$ and results in a square-wave with frequency and phase determined by the frequency and phase of the switch driver square-wave and with an amplitude that is determined by the voltage level of the power source, $V_{DC}$. The power delivered to the load, $Z_0$, is $P_{DLOAD} = (V_{DC})^2/4Z_0$ Watts, which is approximately equal to the power available from the Thevenin-Equivalent power source comprising the voltage source, $V_{DC}$, and the characteristic impedance, $Z_0$.

The power dissipated in the transistor switch is negligible because the saturation voltage in the ON-state is near zero while the collector current in the OFF-state is near zero. However, the overall efficiency of the modulator is degraded by the power dissipated in the switch driver circuit, which was previously computed as $P_{DSD} = (I_{BN} \times V_{BEF})/4$ Watts in the section entitled "A Method for Driving an NPN-Transistor Used as a Periodic Switch in a Common-Emitter Application".

If a Modulator Efficiency Factor (MEF) is defined as the ratio of the power dissipated in the switch driver to the average power delivered to the load, then $MEF = 2V_{BEA}/\beta V_{CEA}$. This relationship demonstrates that the optimum modulator circuit efficiency is established by the parasitic parameters of the switch transistor. A typical switching transistor will have BETA=100 and $V_{BEA} < V_{CEA}/10$ so that a typical value of MEF would be less than 0.002, which indicates that the average square-wave power delivered to the modulator load would be more than five hundred times greater than the switch driver power required to generate the square-wave.

The fundamental frequency and phase of the square-wave delivered to the load 190 is determined by the frequency and phase of the low power level switch driver square-wave. The modulator circuit of FIG. 17 is a high-pass system so that the frequency may be varied over a bandwidth without affecting the overall performance and efficiency of the system. If the frequency is varied by modulating the frequency of the switch driver with an information bearing signal such as voice, music or digital data, then the resulting signal delivered to the load $Z_0$ 190 is a frequency modulated, FM, carrier. Typical FM signals are found in the FM radio band between 88 MHz and 108 MHz.

A form of modulation that is common in digital data system is bi-phase modulation. An information bearing digital signal comprising a stream of "1's" and "0's" is used to control the phase of a carrier such that a transition from 1 to 0 advances the carrier phase by 180 degrees and a transition from 0 to 1 retards the carrier phase by 180 degrees. The phase transitions can be assumed to occur instantaneously while the time between transitions is determined by the ratio of the carrier frequency to the digital data rate. A bi-phase modulated carrier can be generated using the disclosed modulator system by using an information bearing digital data stream to define the phase of the switch driver as one of the two states separated by 180 degrees depending on the state of the digital data stream. For example: a "1" may translate into a phase of 0-degrees while a "0" may translate into a phase of 180-degrees. In this way, digital information can be transmitted using the disclosed modulator as a bi-phase modulator.

Another modulation type is called Quadrature Amplitude Modulation, QAM. In QAM, a constellation of vectors, each representing one of a set of amplitudes and one of a set of phases is defined. Each vector in the constellation represents a binary number with a binary length equal to the base-two logarithm of the number of vectors in the set. For example: each vector in a set of sixteen vectors would represent a binary number of length four and, in this case, an information bearing digital signal would be parsed into "words" of length four and these words would be used to select the appropriate amplitude-phase vector to represent each data word. A modulator is used to create a signal with the appropriate amplitude and phase to represent each vector for transmission. The disclosed modulator can be used for this purpose because it is possible to select a phase from a set of switch-driver phases and, independently select an amplitude from a set of switch-driver amplitudes. In this way, a complex QAM waveform can be created and used to transmit information.

The preferred use of the disclosed modulator to create AM, FM, BPM and QAM modulation types have been described. Those skilled in the electronic arts will recognize that this list is not exhaustive and the other types of modulation can be generated with the disclosed modulator circuit.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method for generating a square-wave, said method comprising the steps of:
   providing a first electrical circuit connectable to a power source and connectable to a load;
   providing a switch embedded in the first electrical circuit with the switch capable of a generating a square-wave of current thru the load when the switch is periodically operated;
   providing a second electrical circuit as a switch-driver that is capable of controlling the switch between an ON state and an OFF state such that in the ON state a current is allowed to flow while the voltage across the switch remains approximately zero and such that in the OFF state a voltage is allowed to exist across the switch while the current through the switch remains near zero;
   generating a square-wave in the switch driver circuit such that the switch is driven periodically between the ON state and the OFF state with approximately equal periods in each state;
   controlling the period of the switch driver in order to modulate the period of the square-wave;
   controlling a phase of the switch driver in order to modulate the phase of the square-wave;
   controlling an amplitude of the power source connected to the first electrical circuit in order to modulate the amplitude of the square-wave; and
   providing a third electrical circuit of a branch with an embedded non-linear two-state device that allows current to flow in the branch in one direction and voltage to appear across the branch in one polarity;
   wherein said third electrical circuit is a two-port network that converts a square-wave to a power source;
   wherein a first port of said third electrical circuit is connected to a Thevenin-Equivalent square-wave source with source resistance $Z_0$, which may represent a transmission line with a characteristic impedance $Z_0$ and a second port connected to a load resistance equal to $Z_0$; and
   wherein said third electrical circuit is capable of input impedance at the first port that is equal to $Z_0$ when driven by the square-wave source and when the second port is terminated in $Z_0$ so that the transmission line with a characteristic impedance $Z_0$ driving the first port will be matched when the Thevenin-Equivalent driving source is a square-wave.

2. A system comprising:
   a first electrical circuit connectable to a power source and connectable to a load;
   a transistor as a switch with said transistor embedded in said first electrical circuit; and
   a second circuit capable of controlling said transistor, said second circuit capable of delivering a base current to turn said transistor ON in a conducting state and a base-emitter bias voltage to turn said transistor OFF in an approximate non-conducting state without exceeding a reverse breakdown of the base-emitter junction with said second circuit as a switch driver capable of periodically changing the state if the transistor from an ON-state to an OFF-state with approximately equal dwell times in each state when the second circuit is driven by a square-wave;
   wherein said first circuit contains energy storage elements arranged such that the DC input impedance of said first circuit is equal to the load impedance, Z, when said transistor as a switch is driven periodically between an ON-state and an OFF-state with approximately equal dwell times in each state.

3. The system in accordance with claim 2 wherein at least one energy storage element of said energy storage elements is a capacitor.

4. The system in accordance with claim 3 wherein the voltage across said capacitor remains approximately constant when said switch changes state.

5. The system in accordance with claim 2 wherein at least one storage element is an inductor.

6. The system in accordance with claim 5 wherein the current through the inductor remains constant when the switching function of the transistor changes state.

* * * * *